US011503601B2

(12) United States Patent
Hakola et al.

(10) Patent No.: US 11,503,601 B2
(45) Date of Patent: Nov. 15, 2022

(54) BEAM MANAGEMENT IN WIRELESS COMMUNICATION

(71) Applicant: Nokia Technologies Oy, Espoo (FI)

(72) Inventors: Sami-Jukka Hakola, Kempele (FI); Kari Juhani Hooli, Oulu (FI); Mihai Enescu, Espoo (FI); Timo Erkki Lunttila, Espoo (FI); Vitaly Petrov, Tampere (FI); Margarita Gapeyenko, Espoo (FI)

(73) Assignee: Nokia Technologies Oy, Espoo (FI)

( * ) Notice: Subject to any disclaimer, the term of this patent is extended or adjusted under 35 U.S.C. 154(b) by 115 days.

(21) Appl. No.: 17/151,455

(22) Filed: Jan. 18, 2021

(65) Prior Publication Data

US 2022/0232546 A1 Jul. 21, 2022

(51) Int. Cl.
*H04B 7/0408* (2017.01)
*H04B 7/06* (2006.01)
(Continued)

(52) U.S. Cl.
CPC ........ *H04W 72/046* (2013.01); *H04B 7/0408* (2013.01); *H04B 7/0695* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2018/0368142 A1 12/2018 Liou
2019/0230706 A1 7/2019 Li et al.
(Continued)

FOREIGN PATENT DOCUMENTS

WO 2020/033406 A2 2/2020

OTHER PUBLICATIONS

Lagen et al., "New Radio Beam-Based Access to Unlicensed Spectrum: Design Challenges and Solutions", IEEE Communications Surveys & Tutorials, vol. 22, No. 1, 2020, pp. 8-37.
(Continued)

*Primary Examiner* — Timothy J Weidner
(74) *Attorney, Agent, or Firm* — Nokia Technologies Oy

(57) ABSTRACT

An apparatus (10) comprising: at least one processor (12); and at least one memory (13) including computer program instructions (14); the at least one memory (13) and the computer program instructions (14) configured to, with the at least one processor (12), cause the apparatus (10) at least to perform: receiving (201) configuration information for enabling the apparatus (10) to measure a first set of Downlink (DL) Reference Signals (RSs) (302) and/or a second set of DLRSs (304), wherein DLRSs (302 #0-302 #4) of the first set of DLRSs (302) are respectively associated with a first set of DL beams (303), wherein one or more DLRSs (302 #1-302 #3) of the first set of DLRSs (302) are configured to be Quasi-Co-Located (QCLed) with at least one DLRS (304 #m) of the second set of DLRSs (304), and wherein DLRSs (304 #a-304 #z) of the second set of DLRSs (304) are respectively associated with a second set of DL beams (305); receiving (202) information for enabling the apparatus (10) to determine a Quasi-Co-Location (QCL) assumption for a Channel Occupancy Time (COT), wherein the QCL assumption for the COT is indicative of the availability, for use for transmissions within the COT, of: at least one DL beam (305 #m) associated with the at least one DLRS (304 #m) of the second set of DLRSs (304), and one or more DL beams (303 #1-303 #3) associated with the one or more DLRSs (302 #1-302 #3) of the first set of DLRSs (302) and QCLed with the at least one DLRS (304 #m) of the second set of DLRS (304); and determining (203), based at least in part on the received information and configuration information, the QCL assumption for the COT.

20 Claims, 4 Drawing Sheets

(51) Int. Cl.

| | |
|---|---|
| *H04B 7/08* | (2006.01) |
| *H04B 17/24* | (2015.01) |
| *H04B 17/318* | (2015.01) |
| *H04B 17/373* | (2015.01) |
| *H04J 11/00* | (2006.01) |
| *H04L 5/00* | (2006.01) |
| *H04W 24/02* | (2009.01) |
| *H04W 24/08* | (2009.01) |
| *H04W 24/10* | (2009.01) |
| *H04W 48/10* | (2009.01) |
| *H04W 48/12* | (2009.01) |
| *H04W 48/16* | (2009.01) |
| *H04W 72/04* | (2009.01) |
| *H04W 72/12* | (2009.01) |
| *H04W 74/00* | (2009.01) |
| *H04W 74/02* | (2009.01) |
| *H04W 74/08* | (2009.01) |
| *H04W 84/04* | (2009.01) |
| *H04W 84/12* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ............. *H04B 7/088* (2013.01); *H04B 17/24* (2015.01); *H04B 17/318* (2015.01); *H04B 17/373* (2015.01); *H04J 11/0079* (2013.01); *H04J 11/0083* (2013.01); *H04J 11/0086* (2013.01); *H04L 5/0048* (2013.01); *H04L 5/0082* (2013.01); *H04L 5/0094* (2013.01); *H04W 24/02* (2013.01); *H04W 24/08* (2013.01); *H04W 24/10* (2013.01); *H04W 48/10* (2013.01); *H04W 48/12* (2013.01); *H04W 48/16* (2013.01); *H04W 72/042* (2013.01); *H04W 72/1289* (2013.01); *H04W 74/006* (2013.01); *H04W 74/02* (2013.01); *H04W 74/0808* (2013.01); *H04W 84/042* (2013.01); *H04W 84/12* (2013.01); *H04W 88/02* (2013.01); *H04W 88/08* (2013.01); *H04W 92/02* (2013.01); *H04W 92/10* (2013.01)

(58) Field of Classification Search
CPC .. H04J 2011/0003–0096; H04L 5/0001–0098; H04W 8/22–245; H04W 16/28; H04W 24/02–10; H04W 28/02–26; H04W 36/0005–385; H04W 48/02–20; H04W 56/0005–0095; H04W 72/005–14; H04W 74/002–0891; H04W 84/02–16; H04W 88/02–12; H04W 92/02; H04W 92/04; H04W 92/10
See application file for complete search history.

(56) References Cited

U.S. PATENT DOCUMENTS

| | | |
|---|---|---|
| 2019/0379431 A1 | 12/2019 | Park et al. |
| 2020/0112355 A1 | 4/2020 | Park et al. |
| 2020/0145169 A1 | 5/2020 | Zhou et al. |
| 2020/0195334 A1 | 6/2020 | Zhou et al. |
| 2020/0196277 A1* | 6/2020 | Zhou ............... H04W 24/02 |
| 2020/0275484 A1 | 8/2020 | Xu et al. |
| 2020/0280859 A1 | 9/2020 | Kim et al. |
| 2020/0304260 A1 | 9/2020 | Si et al. |

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
"New SID: Study on supporting NR from 52.6GHz to 71 GHz", 3GPP TSG RAN Meeting #86, RP-193259, Agenda : 9.1.1, Intel Corporation, Dec. 9-12, 2019, 3 pages.
"3rd Generation Partnership Project; Technical Specification Group Radio Access Network; Study on supporting NR from 52.6 GHz to 71 GHz (Release 17)", 3GPP TR 38.808, V1.0.0, Dec. 2020, pp. 1-153.
"Draft TR 38.808 v020: Study on supporting NR from 52.6 GHz to 71 GHz", 3GPP TSG RAN WG1 Meeting #103-e, R1-2009849, Agenda : 8.2, Intel Corporation, Oct. 26-Nov. 13, 2020, 1 page.
"Revised WID: Extending current NR operation to 71 GHz", 3GPP TSG RAN Meeting #90-e, RP-202925, Agenda : 9.8.2, CMCC, Dec. 7-11, 2020, 6 pages.
"3rd Generation Partnership Project; Technical Specification Group Radio Access Network; Physical layer procedures for shared spectrum channel access (Release 16)", 3GPP TS 37.213, V16.3.0, Sep. 2020, pp. 1-26.
"3rd Generation Partnership Project; Technical Specification Group Radio Access Network; Study on Licensed-Assisted Access to Unlicensed Spectrum; (Release 13)", 3GPP TR 36.889, V13.0.0, Jun. 2015, 285 pages.
"Multiple-Gigabit/s Radio Equipment Operating in the 60 GHz Band; Harmonised Standard for Access to Radio Spectrum", Draft ETSI EN 302 567, V2.2.0, Dec. 2020, pp. 1-42.
"3rd Generation Partnership Project; Technical Specification Group Radio Access Network; NR; Physical layer procedures for control (Release 16)", 3GPP TS 38.213, V16.3.0, Sep. 2020, pp. 1-179.
"3rd Generation Partnership Project; Technical Specification Group Radio Access Network; NR; Physical layer procedures for data (Release 16)", 3GPP TS 38.214, V16.3.0, Sep. 2020, pp. 1-166.
"Beam Management Aspects", 3GPP TSG RAN WG1 #104, R1-21xxxxx, Agenda : 8.2.4, Nokia, Jan. 25-Feb. 5, 2021, 4 pages.
International Search Report and Written Opinion received for corresponding Patent Cooperation Treaty Application No. PCT/EP2021/087479, dated May 11, 2022, 16 pages.

* cited by examiner

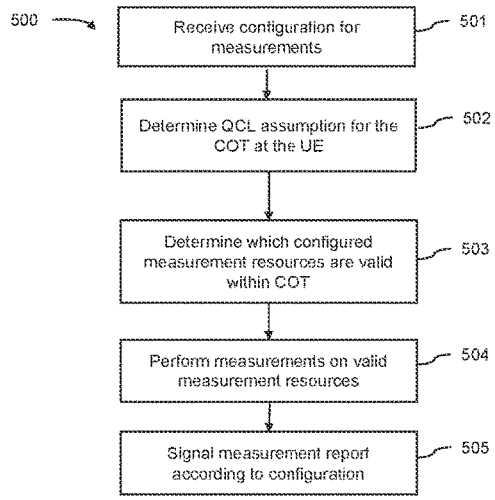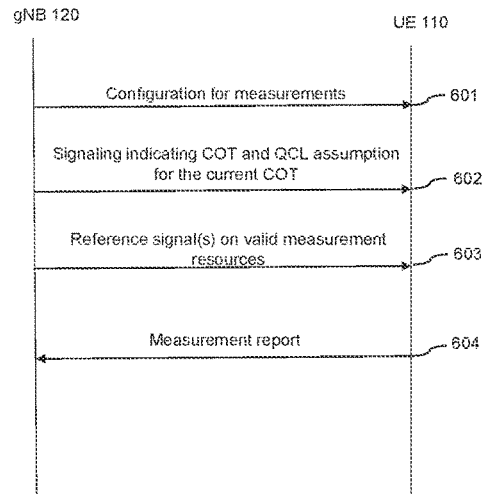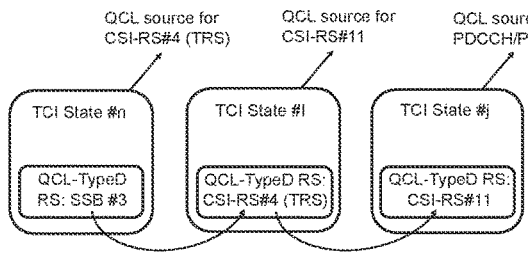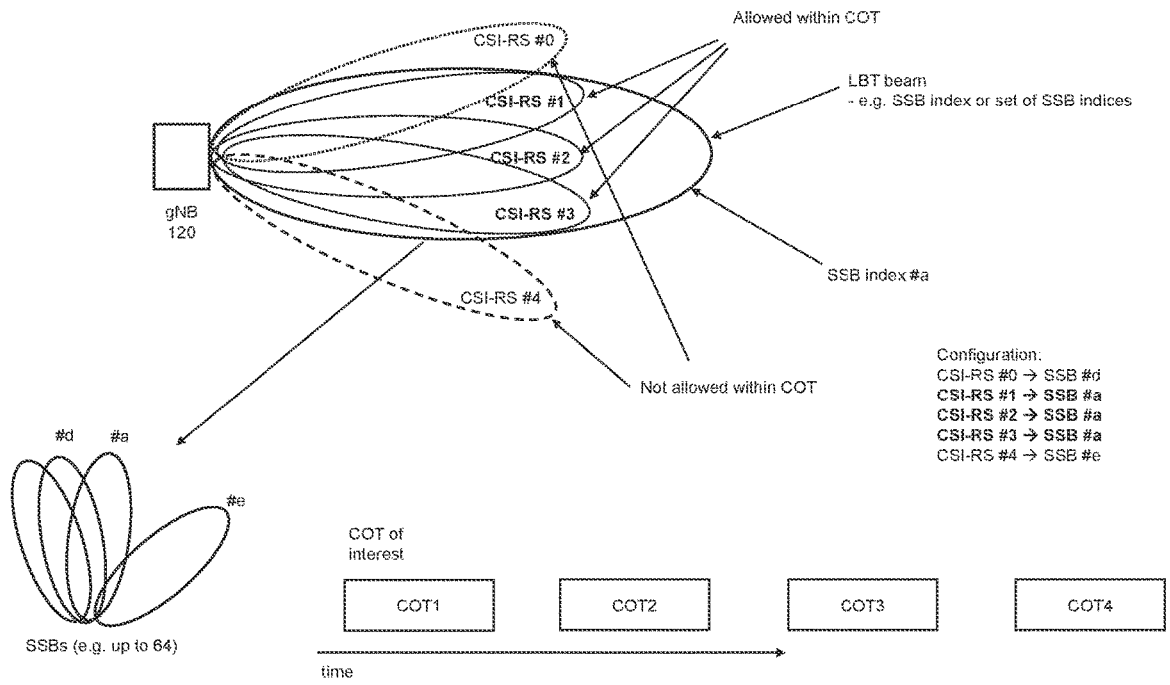

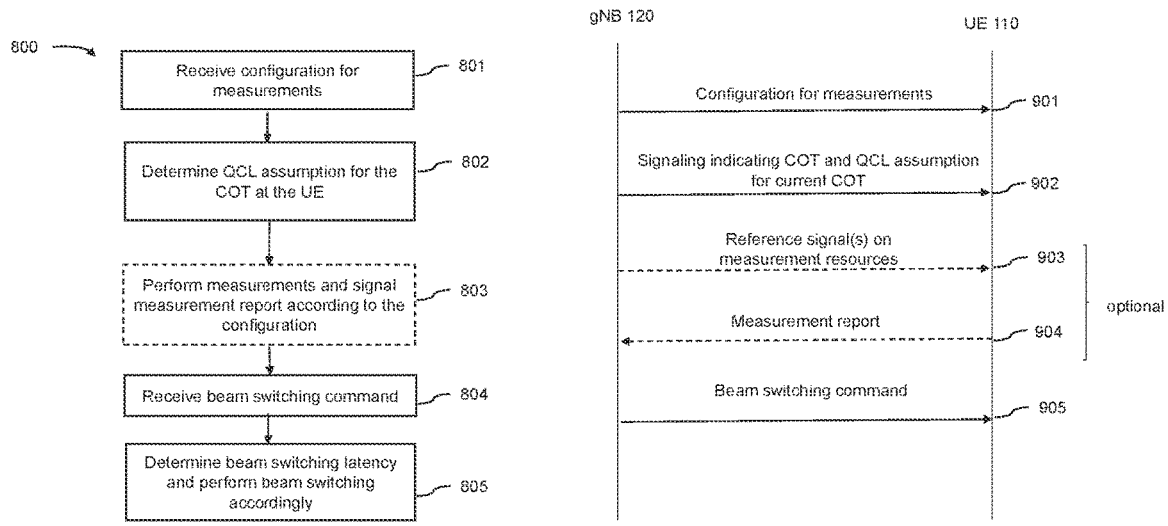
FIG 8A
FIG 8B
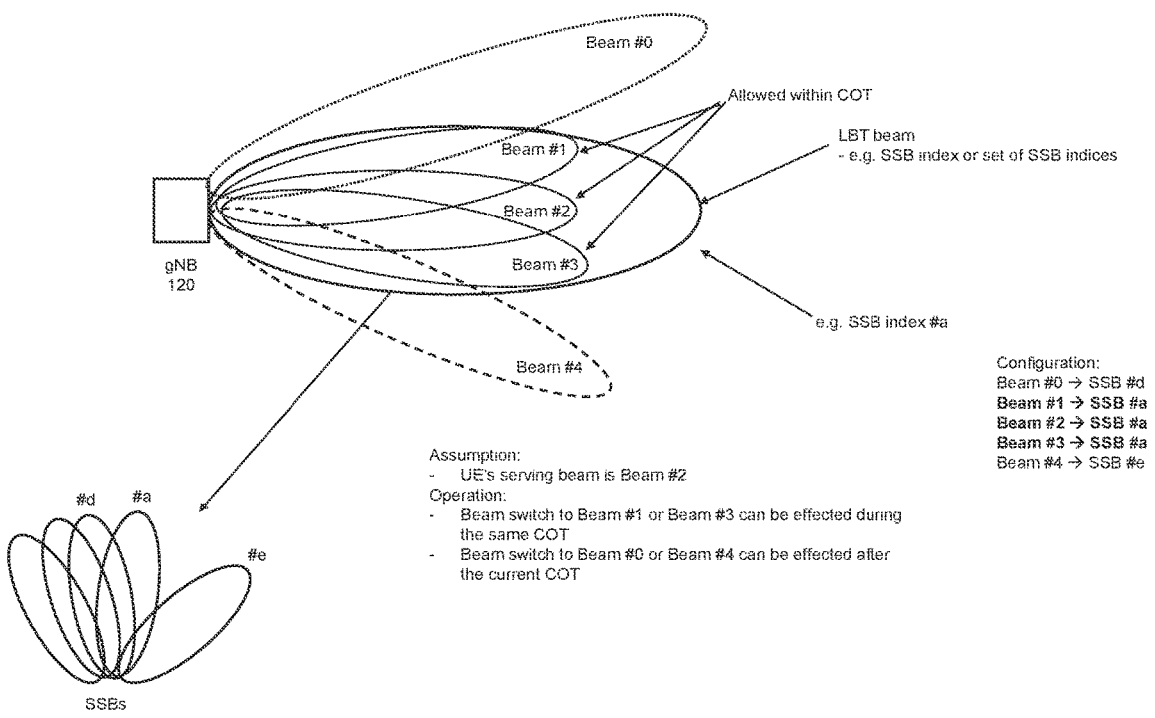
FIG 9

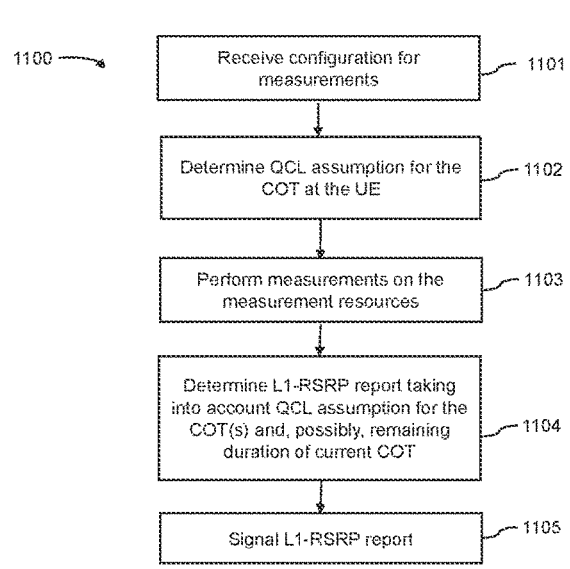
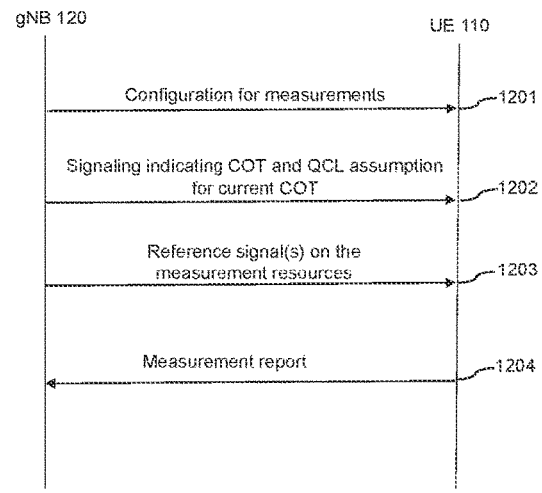
FIG 10A
FIG 10B
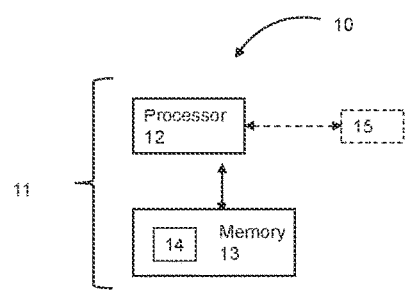
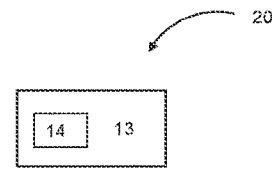
FIG 11
FIG 12

BEAM MANAGEMENT IN WIRELESS COMMUNICATION

TECHNOLOGICAL FIELD

Examples of the present disclosure relate to beam management in wireless communication. Some examples, though without prejudice to the foregoing, relate to beam management during channel occupancy time.

BACKGROUND

A wireless network, such as a wireless Radio Access Network (RAN), comprises a plurality of nodes including terminal nodes, such as User Equipment (UE) and access nodes, such as gNodeBs (gNBs). A gNB may communicate with a UE wirelessly with downlink (DL) transmissions via DL beams. A UE may communicate with access nodes wirelessly with uplink (UL) transmissions via UL beams.

Listen-Before-Talk (LBT) is a channel access procedure wherein a transmitter senses (measures energy on) a channel or medium before an intended transmission. If the transmitter determines that the channel is vacant it may start its transmission. If the transmitter determines that the channel is occupied, it defers or cancels the intended transmission. Directional LBT may be used as a channel access method, wherein the transmitter senses the channel with a narrower beam than an omnidirectional or sector wide beam.

After acquiring channel access based on LBT, a device may occupy the channel for a particular period of time referred to as Channel Occupancy Time (COT). Beam Management (BM) comprises a set of procedures and functionalities that enable, maintain and refine a transmit beam and a receive beam alignment between the transmitter and receiver(s). A beam pair link established between the transmitter and the receiver comprises a transmit beam and receive beam pair.

In some circumstances it may be desirable to provide improved beam management, such as improved: beam measurement, reporting and switching as well as reduced use of resources. It may be desirable to provide improved beam management during COT.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the present disclosure is set out by the independent claims.

Any examples/embodiments and features described in this specification that do not fall under the scope of the independent claims are to be interpreted as examples useful for understanding various embodiments of the present disclosure.

According to at least some examples of the disclosure there is provided an apparatus comprising at least one processor; and
at least one memory including computer program instructions;
the at least one memory and the computer program instructions configured to, with the at least one processor, cause the apparatus at least to perform:
receiving configuration information for enabling the apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
receiving information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS; and
determining, based at least in part on the received information and configuration information, the QCL assumption for the COT.

According to at least some examples of the disclosure there is provided an apparatus comprising means for:
receiving configuration information for enabling the apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
receiving information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS; and
determining, based at least in part on the received information and configuration information, the QCL assumption for the COT.

According to various, but not necessarily all, examples of the disclosure there is provided a method comprising:
receiving configuration information for enabling an apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
receiving information for enabling the apparatus to determine a Quasi-Co-Location (QCL) assumption for a Channel Occupancy Time (COT), wherein the QCL assumption for the COT is indicative of the availability, for use for transmissions within the COT, of:
  at least one DL beam associated with the at least one DLRS of the second set of DLRSs, and/or
  one or more DL beams associated with the one or more DLRSs of the first set of DLRSs and QCLed with the at least one DLRS of the second set of DLRS; and
determining, based at least in part on the received information and configuration information, the QCL assumption for the COT.

According to various, but not necessarily all, examples of the disclosure there is provided a non-transitory computer readable medium encoded with instructions that, when performed by at least one processor, causes at least the following to be performed:
  receiving configuration information for enabling an apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
  receiving information for enabling the apparatus to determine a Quasi-Co-Location (QCL) assumption for a Channel Occupancy Time (COT), wherein the QCL assumption for the COT is indicative of the availability, for use for transmissions within the COT, of:
    at least one DL beam associated with the at least one DLRS of the second set of DLRSs, and/or
    one or more DL beams associated with the one or more DLRSs of the first set of DLRSs and QCLed with the at least one DLRS of the second set of DLRS; and
  determining, based at least in part on the received information and configuration information, the QCL assumption for the COT.

According to various, but not necessarily all, examples of the disclosure there is provided computer program instructions for causing an apparatus to perform:
  receiving configuration information for enabling the apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
  receiving information for enabling the apparatus to determine a Quasi-Co-Location (QCL) assumption for a Channel Occupancy Time (COT), wherein the QCL assumption for the COT is indicative of the availability, for use for transmissions within the COT, of:
    at least one DL beam associated with the at east one DLRS of the second set of DLRSs, and/or
    one or more DL beams associated with the one or more DLRSs of the first set of DLRSs and QCLed with the at least one DLRS of the second set of DLRS; and
  determining, based at least in part on the received information and configuration information, the QCL assumption for the COT.

According to various, but not necessarily all, examples of the disclosure there is provided a chipset comprising processing circuitry configured to perform the above-mentioned method.

According to various, but not necessarily all, examples of the disclosure there is provided a module, a device, a UE and/or system comprising means for performing the above-mentioned method.

The following portion of this 'Brief Summary' section describes various features that can be features of any of the examples described in the foregoing portion of the 'Brief Summary' section.

In some but not necessarily all examples, one or more DL beams associated with the one or more DLRSs of the first set of DLRSs may be configured to have a spatial directivity and/or spatial domain based, at least in part, on a spatial directivity and/or spatial domain of the at least one DL beam associated with the at least one DLRS of the second set of DLRSs.

In some but not necessarily all examples, the spatial directivity and/or spatial domain of the at least one DL beam may correspond to, at least in part, a spatial directivity and/or spatial domain of one or more directional Listen Before Talk (LBT) measurements indicating a vacant channel.

In some but not necessarily all examples, the first set of DLRSs may comprise at least one selected from the group of:
  a set of RSs based on which the apparatus is able to configure a DL receive beam and/or an UL transmit beam of the apparatus,
  a set of spatially QCLed RSs,
  a set of TypeD QCLed RSs,
  a set of Channel State Information Reference Signals (CSI-RSs),
  a set of Synchronization Signal Blocks (SSBs), and
  a set of CSI-RSs wherein one or more of the set of CSI-RSs is TypeD QCLed with at least one SSB.

In some but not necessarily all examples, the information for enabling the apparatus to determine the QCL assumption for the COT may comprise at least one selected from the group of:
  information indicative of at least one DLRS index of the at least one DLRS of the second set of DLRSs; and/or
  information indicative of an SSB index or SSB indexes.

In some but not necessarily all examples, the at least one memory and the computer program instructions may be configured to, with the at least one processor, cause the apparatus at least to perform:
  performing, during the COT and based at least in part on the QCL assumption for the COT, DLRS measurements for the one or more DLRs of the first set of DLRSs and/or the at least one DLRS of the second set of DLRSs.

In some but not necessarily all examples, the at least one memory and the computer program instructions may be configured to, with the at least one processor, cause the apparatus at least to perform:
  selecting, based at least in part on the QCL assumption for the COT, one or more measurement resources for the first set of DLRSs for the COT.

In some but not necessarily all examples, the at least one memory and the computer program instructions may be configured to, with the at least one processor, cause the apparatus at least to perform:
  performing DLRS measurements using the selected measurement resources; and transmitting a measurement report of the DLRS measurements.

In some but not necessarily all examples, the at least one memory and the computer program instructions may be configured to, with the at least one processor, cause the apparatus at least to perform:

precluding, during the COT, transmission from the apparatus via UL transmission beams other than one or more UL transmission beams corresponding to the one or more DL beams associated with the one or more DLRSs of the first set of DLRSs.

In some but not necessarily all examples, the at least one memory and the computer program instructions may be configured to, with the at least one processor, cause the apparatus at least to perform:

determining whether to perform a beam switch during the COT based at least in part on the QCL assumption for the COT.

In some but not necessarily all examples, the at least one memory and the computer program instructions may be configured to, with the at least one processor, cause the apparatus at least to perform:

receiving a command for the apparatus to switch to using a new beam, wherein the new beam is associated with a DLRS of the first set of DLRSs;

determining whether the new beam is one of the at least one DL beam used for transmission within the COT, based at least in part on:
  the QCL assumption for the COT,
  the one or more DLRs of the first set of DLRSs, and/or
  the at least one DLRS of the second set of DLRSs;

switching, responsive at least in part to determining the new beam is one of the at least one DL beam used for transmission within the COT, to the new beam within the COT; and switching, responsive at least in part to determining the new beam is not one of the at least one DL beam used for transmission within the COT, to the new beam after the COT.

In some but not necessarily all examples, the at least one memory and the computer program instructions may be configured to, with the at least one processor, cause the apparatus at least to perform:

determining a beam switch latency of the apparatus;
wherein the switching to the new beam within the COT is further based, at least in part, on the beam switch latency.

In some but not necessarily all examples, the at least one memory and the computer program instructions may be configured to, with the at least one processor, cause the apparatus at least to perform:

configuring, based at least in part on the configuration information, the apparatus with measurement resources for the first set of DLRSs; and performing DLRS measurements for the first set of DLRSs using measurement resources.

In some but not necessarily all examples, the at least one memory and the computer program instructions may be configured to, with the at least one processor, cause the apparatus at least to perform:

selecting, based at least in part on the QCL assumption for the COT, one or more DLRS measurements on the one or more DLRS of the first set of DLRSs, and/or on the at least one DLRS of the second set of DLRSs, for transmitting in a measurement report.

In some but not necessarily all examples, the at least one memory and the computer program instructions may be configured to, with the at least one processor, cause the apparatus at least to perform:

biasing, based at least in part on the QCL assumption for the COT. DLRS measurements on the one or more DLRS of the first set of DLRSs, and/or on the at least one DLRS of the second set of DLRSs, in a selection of DLRS measurements for transmitting in a measurement report.

In some but not necessarily all examples, the at least one memory and the computer program instructions may be configured to, with the at least one processor, cause the apparatus at least to perform:

determining a remaining duration of the COT;
wherein the selection of the one or more DLRS measurements for transmitting in a measurement report is further based, at least in part, on the remaining duration of the COT.

According to at least some examples of the disclosure there is provided an apparatus comprising:

at least one processor; and at least one memory including computer program instructions;

the at least one memory and the computer program instructions configured to, with the at least one processor, cause the apparatus at least to perform:

sending configuration information for enabling a second apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and sending information for enabling the second apparatus to determine a Quasi-Co-Location (QCL) assumption for a Channel Occupancy Time (COT), wherein the QCL assumption for the COT is indicative of the availability, for use for transmissions within the COT, of:
  at least one DL beam associated with the at least one DLRS of the second set of DLRSs, and/or
  one or more DL beams associated with the one or more DLRSs of the first set of DLRSs and QCLed with the at least one DLRS of the second set of DLRS.

According to at least some examples of the disclosure there is provided an apparatus comprising means for:

sending configuration information for enabling a second apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and sending information for enabling the second apparatus to determine a Quasi-Co-Location (QCL) assumption for a Channel Occupancy Time (COT), wherein the QCL assumption for the COT is indicative of the availability, for use for transmissions within the COT, of:
  at least one DL beam associated with the at least one DLRS of the second set of DLRSs, and/or one or more DL beams associated with the one or more DLRSs of the first set of DLRSs and QCLed with the at least one DLRS of the second set of DLRS.

According to various, but not necessarily all, examples of the disclosure there is provided a method comprising:

sending configuration information for enabling an apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and sending information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS.

According to various, but not necessarily all, examples of the disclosure there is provided a non-transitory computer readable medium encoded with instructions that, when performed by at least one processor, causes at least the following to be performed:

sending configuration information for enabling an apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and sending information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS.

According to various, but not necessarily all, examples of the disclosure there is provided computer program instructions for causing an apparatus to perform sending configuration information for enabling a second apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and sending information for enabling the second apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS.

According to various, but not necessarily all, examples of the disclosure there is provided a chipset comprising processing circuitry configured to perform the above-mentioned method.

According to various, but not necessarily all, examples of the disclosure there is provided a module, a device, an access node and/or system comprising means for performing the above-mentioned method.

The following portion of this 'Brief Summary' section describes various features that can be features of any of the examples described in the foregoing portion of the 'Brief Summary' section.

In some but not necessarily all examples, the at least one memory and the computer program instructions may be configured to, with the at least one processor, cause the apparatus at least to perform:
configuring one or more DL beams associated with the one or more DLRSs of the first set of DLRSs to have a spatial directivity and/or spatial domain based, at least in part, on a spatial directivity and/or spatial domain of the at least one DL beam associated with the at least one DLRS of the second set of DLRSs.

In some but not necessarily all examples, the spatial directivity and/or spatial domain of the at least one DL beam may correspond to, at least in part, a spatial directivity and/or spatial domain of one or more directional Listen Before Talk (LBT) measurements indicating a vacant channel.

In some but not necessarily all examples, the first set of DLRSs may comprise at least one selected from the group of:
a set of RSs based on which the second apparatus is able to configure a DL receive beam and/or an UL transmit beam of the second apparatus,
a set of spatially QCLed RSs,
a set of TypeD QCLed RSs,
a set of Channel State Information Reference Signals (CSI-RSs),
a set of Synchronization Signal Blocks (SSBs), and
a set of CSI-RSs wherein one or more of the set of CSI-RSs is TypeD QCLed with at least one SSB.

In some but not necessarily all examples, the information for enabling the second apparatus to determine the QCL assumption for the COT may comprise at least one selected from the group of:
information indicative of at least one DLRS index of the at least one DLRS of the second set of DLRSs; and/or
information indicative of an SSB index or SSB indexes.

In some but not necessarily all examples, the at least one memory and the computer program instructions may be configured to, with the at least one processor, cause the apparatus at least to perform:
sending a command for the second apparatus to switch to using a new beam, wherein the new beam is associated with a DLRS of the first set of DLRSs.

While the above examples of the disclosure and optional features are described separately, it is to be understood that their provision in all possible combinations and permutations is contained within the disclosure. Also, it is to be understood that various examples of the disclosure may comprise any or all of the features described in respect of other examples of the disclosure, and vice versa.

According to various, but not necessarily all, examples of the disclosure there are provided examples as claimed in the appended claims.

BRIEF DESCRIPTION OF THE DRAWINGS

For a better understanding of various examples of the present disclosure that are useful for understanding the detailed description and certain examples of the present disclosure, reference will now be made by way of example only to the accompanying drawings in which:

FIG. 5A shows another example of the subject matter described herein;

FIG. 5B shows another example of the subject matter described herein;

FIG. 6 shows another example of the subject matter described herein;

FIG. 7 shows another example of the subject matter described herein;

FIG. 8A shows another example of the subject matter described herein;

FIG. 8B shows another example of the subject matter described herein;

FIG. 9 shows another example of the subject matter described herein;

FIG. 10A shows another example of the subject matter described herein;

FIG. 10B shows another example of the subject matter described herein;

FIG. 11 shows another example of the subject matter described herein; and

FIG. 12 shows another example of the subject matter described herein.

Figure 1:
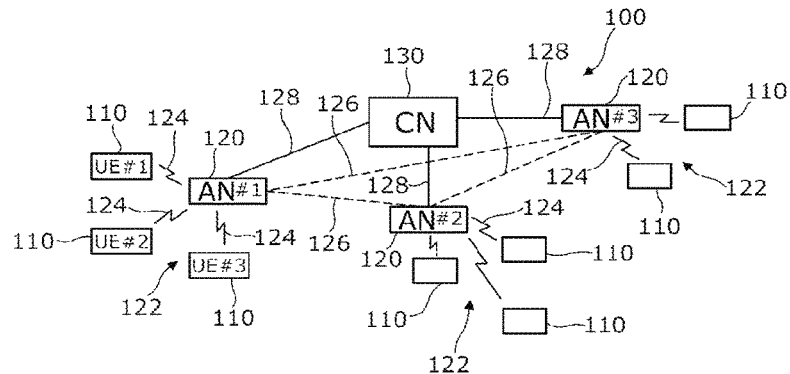
FIG. 1 shows an example of the subject matter described herein.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

ABBREVIATIONS

BM Beam Management
CC Component Carriers
CE Control Element
CORESET Control Resource Set
COT Channel Occupancy Time
CSI-RS Channel State Information Reference Signal
DCI Downlink Control Information
DL Downlink
DL-RS Downlink Reference Signal
DM-RS DeModulation Reference Signal
GC Group Common
gNB gNodeB
IoT Internet of Things
L1-RSRP Layer 1 Reference Signal Received Power
LBT Listen-Before-Talk
MAC Medium Access Control
NB-IoT NarrowBand-Internet of Things
NR New Radio (5G)
PDCCH Physical Downlink Control Channel
PDSCH Physical Downlink Shared Channel
PUCCH Physical Uplink Control Channel
PUSCH Physical Uplink Shared Channel
QCL Quasi-Co-Location
QCLed Quasi-Co-Located
RAN Radio Access Network
RRC Radio Resource Control
RS Reference Signal
SCS Short Control Signalling
SRS Sounding Reference Signal
SSB Synchronization Signal Block
TCI Transmission Coordination Indication
TRS Tracking Reference Signal
UE User Equipment
UL Uplink

DETAILED DESCRIPTION

The figures schematically illustrate, and the following description describes, various examples of the disclosure including an apparatus (10), for example a UE (110), comprising:

at least one processor (12); and
at least one memory (13) including computer program instructions (14);
the at least one memory (13) and the computer program instructions (14) configured to, with the at least one processor (12), cause the apparatus (10) at least to perform:
  receiving (201) configuration information for enabling the apparatus (10) to measure a first set of Downlink Reference Signals (DLRSs) (302) and/or a second set of DLRSs (304), wherein DLRSs (302 #0-302 #4) of the first set of DLRSs (302) are respectively associated with a first set of DL beams (303), wherein one or more DLRSs (302 #1-302 #3) of the first set of DLRSs (302) are configured to be Quasi-Co-Located (QCLed) with at least one DLRS (304 #m) of the second set of DLRSs (304), and wherein DLRSs (304 #a-304 #z) of the second set of DLRSs (304) are respectively associated with a second set of DL beams (305);
  receiving (202) information for enabling the apparatus (10) to determine a Quasi-Co-Location (QCL) assumption for a Channel Occupancy Time (COT), wherein the QCL assumption for the COT is indicative of the availability, for use for transmissions within the COT, of:
    at least one DL beam (305 #m) associated with the at least one DLRS (304 #m) of the second set of DLRSs (304), and/or
    one or more DL beams (303 #1-303 #3) associated with the one or more DLRSs (302 #1-302 #3) of the first set of DLRSs (302) and QCLed with the at least one DLRS (304 #m) of the second set of DLRS (304); and
  determining (203), based at least in part on the received information and configuration information, the QCL assumption for the COT.

FIG. 1 schematically illustrates an example of a Radio Access Network (RAN) 100 comprising a plurality of network nodes including terminal nodes 110 (also referred to as User Equipment, UE), access nodes (AN) 120 (also referred to as RAN nodes) and a core network (CN) 130.

The terminal nodes 110 and access nodes 120 communicate with each other. The core network 130 communicates with the access nodes 120 via backhaul interfaces 128 (e.g., S1 and/or NG interface). One or more core nodes of the core network 130 may, in some but not necessarily all examples, communicate with each other. The one or more access nodes 120 may, in some but not necessarily all examples, communicate with each other.

The RAN 100 may be a cellular network comprising a plurality of cells 122 each served by an access node 120. The interfaces between the terminal nodes 110 and the access nodes 120 are radio interfaces 124. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e. Multi Radio Access Technology-Dual Connection (MR-DC), not least for example such as:

Evolved Universal Terrestrial Radio Access-New Radio Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node can be implemented as a single network equipment, or disaggregated/distributed over two or more RAN nodes, such as a central unit (CU), a distributed unit (DU), a remote radio head-end (RRH), using different functional-split architectures and different interfaces.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

In the following description, an access node 120 will be referred to as a network node or a gNB, and a terminal node 110 will be referred to as a UE 110.

Each of the network node 120 and UE 110 may comprise one or more antennas, antenna patches and/or antenna panels, each comprising an array of antenna elements serving as receivers and transmitters. A controller controls phase shifts and amplitudes of the radio frequency electrical signals applied to the antenna elements to generate a beamformed directional electromagnetic wave transmitted signal having a controlled direction/beam steering direction and a beam pattern (radiation pattern), thereby forming a transmission beam (e.g. a network node transmission beam for use with downlink transmission—referred to herein as a DL beam; and a UE transmission beam for use with uplink transmission—referred to herein as an UL beam). The transmission beam relates to a spatially directed transmission with power focussed in an aiming direction or beam steering/pointing angle, such an angle corresponding to a direction of a main lobe of the transmitted radiation pattern.

The controller may process the phase shifts and amplitudes of radio frequency electrical signals from the antenna elements (such radio frequency electrical signals corresponding to transduced electrical signals from received electromagnetic wave signals) to achieve a preferred beamforming direction for reception, thereby forming a reception beam (e.g. a UE reception beam for use with downlink reception, and a network node reception beam for use with uplink reception). The reception beam relates to spatially directed reception wherein reception sensitivity is maximal at an aiming direction or pointing angle.

Beamforming, to form directional links for radio communication, may be used to compensate for high path-losses due to poor radio frequency (RF) propagation, which may affect not least the high frequency transmissions that can be used with 5G NR networks, e.g. transmissions at Frequency Range 2 (FR2) i.e. in the region of 24-52.6 GHz (as compared to Frequency Range 1 (FR1)'s sub 6 Ghz range) as well as frequencies in excess of FR2, i.e. above 52.6 GHz and especially on the 60 GHz unlicensed band(s). Examples of the present disclosure may find application in 3GPP New Radio (NR) operation at frequencies above 52.6 GHz.

Transmission of signals to the UE 110 from the network node 120 is downlink (DL) transmission via a beam pair. Such a beam pair may be considered to comprise a directional transmission beam from the network node (referred to herein as a DL beam) and a directional reception beam of the UE. Such a directional transmitter-side beam and a corresponding aligned directional receiver side beam jointly provide a beam pair for DL transmission/reception and connectivity (i.e. an optimal radio communication link/channel within the constraints of power, bandwidth and signal quality). It is to be appreciated that the transmission and reception beams are not necessarily physically aligned towards each other/in direct line of sight, not least for example in situations where there is a rich-scattering environment.

In a 5G NR network, the beam pair may be considered to relate to a beamformed directional link from the network node to the UE, such a directional link having a directional transmission beam for network node transmission (network node DL Tx beam), and a corresponding aligned directional reception beam for the DL reception (UE DL Rx beam), such a transmission beam and reception beam for DL transmission thereby defining a beam pair for DL transmission/reception.

Similarly, UL transmission of signals from the UE 110 to the network node 120 is via a beam pair comprising a directional transmission beam (from the UE) and directional reception beam (of the network node). Such a directional transmitter-side beam and a corresponding aligned directional receiver side beam jointly provide a beam pair for UL transmission/reception and connectivity.

A transmitter, e.g. a transmitting network node, may use beam sweeping (i.e. transmitting reference signals from each of its directional transmission beams) to enable a receiver, e.g. a UE, to determine an optimal transmission beam that provides optimal reception by the receiver. The receiver may itself use beam sweeping, e.g. of its directional reception beams, to enable a receiver to determine an optimal reception beam that provides optimal reception by the receiver. In such a manner, the receiver's reception beam may be duly aligned with the determined optimal transmission beam.

The UE is configured to monitor a downlink reception quality parameter, for example, Reference Signal Received Power (RSRP), of a downlink reference signal, such as Synchronization Signal Block (SSB) and/or Channel State Information Reference Signal (CSI-RS). The downlink reception quality parameter is dependent upon the path loss incurred by the reference signals after propagation over the air. The downlink reception quality parameter is further dependent upon downlink reception gain or loss, which may depend not least upon the number of antenna elements of the UE used for downlink reception and the beam steering angle. The UE can infer whether or not a candidate downlink beam having a particular beam steering angle is optimal or acceptable for use in DL communication based on the reception quality parameter for the candidate DL beam, i.e. if the RSRP is above a sensitivity limit (the sensitivity limit being defined as the lowest received power level at which the downlink can still be decoded at a given bit error rate).

Beam management, such as relating to the determination and alignment of a transmitter/receiver beam pair, may be performed based on an assumption of DL/UL beam correspondence or beam reciprocity. For example, in time division duplexing (TDD), a channel reciprocity assumption may assume that the UL and DL channels are identical. Since the channel status of the UL and DL are assumed identical, the network node may determine and configure its reception beam for UL transmission from the UE based on the network node's optimal transmission beam for DL transmission to the UE (i.e. the DL reception beam reported by the UE as having the best measured DL reception quality parameter, for example, Reference Signal Received Power (RSRP)). When using beam correspondence/reciprocity, the phase shift configuration for the network node's antenna array used for its transmission beam for DL transmission can be (re-used for a reception beam for UL reception, thereby simplifying beam management. Similarly, the UE may determine and configure its transmission beam for UL transmission to the network node based on an optimal reception beam for DL transmission from the network node.

Typically, in most instances, a transmission/reception beam pair for DL (i.e. a transmission/reception beam pair for communication in the DL direction) will be a suitable, i.e. valid, reception/transmission beam pair for UL (i.e. a reception/transmission beam pair for communication in the UL direction). In 3GPP, this is referred to a DL/UL beam correspondence or beam reciprocity. In view of this, in order to provide fast beam alignment/management, a network node's selection of a reception beam for UL transmission from a UE may be based on the UE's reporting of an optimal DL beam and DL reports. For example, the network node's UL receive (Rx) beam may be determined based on the network node's DL transmission (Tx) beam that was used for DL transmission and which resulted in the best/optimal DL beam reported in the DL beam report. Typically, in a single DL beam report, the UE provides up to best N, where N could be up to 4, DL RS's (such DL RS's having a 1:1 association to their respective DL beam hence each DL RS characterizes and defines its associated DL beam).

The following is a discussion of various procedures (e.g. LBT), channel access techniques (e.g. COT) and signalling (e.g. Short Control Signalling, PDCCH, and GC-PDCCH) and beam management principles that may be used with examples of the present disclosure.

Listen-Before-Talk Procedure—LBT

LBT is a channel access procedure wherein a transmitter senses (i.e. measures energy on) a channel or medium before an intended transmission. If the transmitter determines that the channel is vacant it may start its transmission. If the transmitter determines that the channel is occupied, it defers or cancels the transmission. The determining may be based on comparing the measured received energy over a certain time period and over certain frequency resources against a defined Energy Detection threshold (ED). The determining may contain single or multiple measurements referred to as Clear Channel Assessments (CCAs). There are multiple variants of LBT:

In type 1 LBT (as referred to in TS37.213), the device shall measure the channel to be free for a random number of occasions before accessing the channel. The random number is uniformly distributed over a range referred to as a contention window. The contention window may be adjusted based on detected channel access collisions between multiple transmissions (e.g. type 1 LBT in TS37.213 or Cat. 4 LBT in TR36.889) or the contention window may be of fixed size (Cat. 3 LBT in TR36.889).

In type 2A/B LBT (as referred to in TS37.213) or Cat. 2 LBT (as referred to in TR36.889), the device performs a single measurement (single CCA) when determining the channel occupancy.

LBT measurements are performed at least by the transmitter, but the LBT procedure may also incorporate measurements carried out at the receiver, in other words, the receiver may also monitor the channel access occupancy.

At higher carrier frequencies, where narrow beams are typically used, a directional LBT may be used as a channel access method. In this, the transmitter senses the medium or channel with a narrower beam than an omnidirectional or sector wide beam. The transmitter may also use a number of narrow beams to sense the medium on certain spatial domain or direction. Consequently, the subsequent transmission would be using the same or a narrower beam in the spatial domain or direction declared free by the LBT beam (or beams).

In the following discussion we consider LBT beam as a receive beam with certain direction and beamwidth at the intended transmitter used to perform measurements to determine whether or not the intended radio resources (in a certain direction and of a certain spatial/angular extent) are free. Furthermore, we consider a transmission beam as a beam with a certain direction and beamwidth, hence a beam characterized by a specific spatial filter. It is assumed that the transmission beam needs to be the same as the LBT beam (or one of the LBT beams) or a sub-beam of the LBT beam. In order words, the LBT beam is Quasi-Co-Located (QCLed) with the transmission beam at least from the spatial perspective, i.e. Quasi-Co-Location (QCL) type D. Other QCL parameters may be also common, but not necessarily. Such an operation resembles the beam correspondence where the same spatial filter used to receive a signal as is used for the transmission by the gNB or the UE.

Channel Occupancy Time—COT

After acquiring channel access based on the LBT procedure, a device may occupy the channel for a period of time. This is referred to as channel occupancy time (COT). The COT is constrained by a maximum allowed duration, e.g., 5 ms as in ETSI EN 302 567. The COT may contain multiple transmissions. A device (a UE and/or a gNB) initiating COT may schedule transmissions for a responding device within the COT. In other words, a COT may contain multiple downlink and/or uplink transmissions from the gNB and/or UE. The device initiating the COT may perform type 1 LBT, and the responding device may perform type 2A/B LBT or no LBT at all.

When directional LBT is applied by a transmitter, such as a gNB, before COT, it is assumed that subsequent transmissions during the COT may take place only using transmit beam(s) confined within the spatial directions/domain sensed by the (directional) LBT beam(s).

Channel access may have constraints on transmission pauses or silent gaps within the COT, which may be caused e.g. by DL/UL switching.

The UE may be informed about the remaining duration of the COT by the gNB in a channel occupancy duration field in DCI format 2_0-3GPP TS 38.213 v18.3.0:

without needing to perform LBT). In the latest draft of EN 302 587 (ETSI standard), short control signalling is introduced, with the duration of short control signalling transmissions constrained to 10% of time within an observation window of 100 ms.

Group Common Physical Downlink Control Channel— GC-PDCCH

NR supports different Group Common Physical Downlink Control Channels (GC-PDCCHs) carrying Downlink Control Information (DCI) that can be intended for more than one UE. From the UE's perspective, these are just DCI formats that are scrambled with certain Radio Network Temporary Identifiers (RNTIs) where the part of the payload is intended for the UE, i.e. only a sub-set of the full DCI information bits are indicated to contain information specifically for a given UE. Examples of GC-PDCCH are slot format indication (DCI format 2-0 scrambled by SFI-RNTI) used to signal a (dynamic) slot format for the UE(s), pre-emption indication (DCI format 2_1 scrambled by INT-RNTI for DL in Rel-15 and DCI format 2_4 scrambled by CI-RNTI in Rel-16) to inform UE that preceding transmission on certain DL resources was not done (as intended/scheduled) or that scheduled UL transmission should not be done. In addition, UL power control commands for PUCCH, PUSCH and SRS can be provided in GD-PDCCHs (DCI format 2_2 and 2_3). In Rel-16 an additional GC-PDCCH DCI format was introduced for power saving purposes (DCI format 2_6 scrambled by PS-RNTI), which is used as a more detailed example below. DCI format 2_0 contents were also extended in Rel-16 with channel-occupancy-duration, search-space switching bit, and RB-set indicator for NR-Unlicensed operation.

Beam Management Principles

Beam management comprises a set of procedures and functionalities that enable, maintain and refine the transmit and receive beam alignment between the transmitter and the receiver(s). A beam pair link established between a transmitter and a receiver comprises a transmit beam and receive beam pair. The beam pair link between a gNB and a UE may be the same or different in downlink and uplink. In DL the gNB provides the UE with a QCL TypeD RS based on which the UE can set its receive beam and a spatial relation info in UL, based on which the UE can further set its transmit beam, i.e. its DL beam.

The QCL of two antenna ports means that the channel conditions for the symbols transmitted from those antenna

---

. . . a location of a channel occupancy duration field in DCI format 2_0, by CO-DurationsPerCell-r16, that indicates a remaining channel occupancy duration for the serving cell starting from a first symbol of a slot where the UE detects the DCI format 2_0 by providing a value from CO-DurationList-r16. The channel occupancy duration field includes maxlog2COdurationListSize, 1 bits, where COdurationListSize is the number of values provided by CO-DurationList-r16. If CO-DurationsPerCell-r16 is not provided, the remaining channel occupancy duration for the serving cell is a number of slots, starting from the slot where the UE detects the DCI format 2_0, that the SFI-index field value provides corresponding slot formats a location of a channel occupancy duration field in DCI format 2_0, by CO-DurationsPerCell-r16, that indicates a remaining channel occupancy duration for the serving cell starting from a first symbol of a slot where the UE detects the DCI format 2_0 by providing a value from CO-DurationList-r16. The channel occupancy duration field includes maxlog2COdurationListSize, 1 bits, where COdurationListSize is the number of values provided by CO-DurationList-r16. If CO-DurationsPerCell-r16 is not provided, the remaining channel occupancy duration for the serving cell is a number of slots, starting from the slot where the UE detects the DCI format 2_0, that the SFI-index field value provides corresponding slot formats . . .

---

Short Control Signalling—SCS

Short Control Signalling (SCS) determines a limited number of control and management signals that a device can sent without sensing channel before the transmission (e.g.

ports are similar. Depending on the set of properties for the channel conditions 3GPP TS 38.214 defines the following QCL-types: QCL-TypeA, QCL-TypeB, QCL-TypeC, QCL-TypeD. Examples of the present disclosure may make use of QCL-TypeD where a spatial Rx parameter is employed to define channel conditions and is used to support beamforming.

Strictly speaking, QCL defines the relation between two reference signals at the UE receiver. In practice, the gNB can only guarantee that the properties of two reference signals are similar if the two reference signals are transmitted from the same transmission and reception point (TRP). NR considers in general the transmission of any reference signal from any TRP.

QCL-TypeD Reference Signals (RSs) can be SSB and/or CSI-RS. In beam indication, for the target signal to be received (e.g. DMRS of PDSCH, DMRS of PDCCH, CSI-RS), the UE is provided a Transmission Coordination Indication (TCI) state (container) that comprises an indication of the QCL-TypeD RS. The UE applies the same RX beam to receive target signal, as it used to receive the given QCL-TypeD RS (SSB and/or CSI-RS resource) in the TCI state. The UE can be configured with up to 64 or 128 (if UE capability allows) TCI states. The TCI State container is as follows [3GPP TS 38.331];

```
TCI-State ::=                    SEQUENCE {
    tci-StateId                      TCI-StateId,
    qcl-Type1                        QCL-Info,
    qcl-Type2                        QCL-Info
OPTIONAL, -- Need R
    ...
}
QCL-Info ::=                     SEQUENCE {
    cell                             ServCellIndex
OPTIONAL, -- Need R
    bwp-Id                           BWP-Id
OPTIONAL, -- Cond CSI-RS-Indicated
    referenceSignal                  CHOICE {
        csi-rs                           NZP-CSI-RS-
Resourceld,
        ssb                              SSB-Index
    },
    qcl-Type                         ENUMERATED {typeA,
typeB, typeC, typeD},
    ...
}
```

In the UL, the UE is provided a spatial source RS. It can be an SSB, CSI-RS or SRS. For SSB or CSI-RS, the UE uses the Rx beam used to receive the given SSB or CSI-RS resource as spatial relation for the Tx beam to transmit target signal (e.g. PUSCH, PUCCH, SRS). For SRS, the UE uses, as a Tx beam to transmit a target signal, the same Tx beam as is used to transmit the given SRS resource. The spatial relation information e.g. for SRS is defined as follows [TS 3GPP 38.331]:

```
SRS-SpatialRelationInfo ::=      SEQUENCE {
    servingCellId                    ServCellIndex
OPTIONAL, -- Need S
    referenceSignal                  CHOICE {
        ssb-Index                        SSB-Index,
        csi-RS-Index                     NZP-CSI-RS-
Resourceld,
        srs                              SEQUENCE {
            resourceId                       SRS-ResourceId,
            uplinkBWP                        BWP-Id
        }
    }
}
```

The main procedures and functionalities in beam management are:

measurements and reporting of candidate reference signals that can act as a source to determine transmit and receive beam pair in downlink and in uplink
  Typical assumption is that DL RSs are used for both DL and UL beam indication
  Tx/Rx beam correspondence is assumed at the UE
  UE is explicitly configured with SSB and/or CSI-RS resources for L1-RSRP measurements and reporting (CSI-RS framework)
    the UE may be configured with CSI-RS resource setting for up to 16 CSI-RS resource sets having up to 64 resources within each set. The total number of different CSI-RS resources over all resource sets is no more than 128
  UE reports the L1-RSRP of {1, 2, 3 or 4} best SSBs or CSI-RSs per report config
    The reporting comprises a resource index and L1-RSRP value
beam indication/beam switching
  In downlink, the UE is provided a TCI state for the target signal, based on which the UE can receive the target signal. The TCI state is provided either:
    with RRC configuration for P-CSI-RS (including TRS)
    with MAC-CE for PDCCH (one active TCI state per CORESET), SP-CSI-RS, AP-CSI-RS, PUSCH (when follows PDCCH)
    with DCI for PDSCH (when explicit indication in use), and AP-CSI-RS (triggering of certain CSI-RS resource set(s)
  In uplink, the UE is provided a spatial relation for the target signal based on which the UE forms the transmit beam. The provisioning of the spatial relation is either:
    RRC based (for P-SRS)
    MAC-CE based (for SP-SRS, AP-SRS, PUCCH, PUSCH (when follows PUCCH with resource ID=0)), or
    DCI based (indirectly for PUSCH (DCI indicates reference SRS(s) so that UE shall transmit PUSCH with the same beam(s) as it transmitted given SRSs)
  Some default beam assumptions have been defined in Rel15/Rel16
    PDSCH:
      If scheduling offset<timeDurationForQCL: TCI state is the one of the lowest Control Resource Set (CORESET) ID in the latest slot monitored by UE
      If scheduling offset>=timeDurationForQCL: TCI state is the one of the CORESET of the scheduling PDCCH if TCI state is not provided in the DCI, or PDSCH reception is based on the TCI state provided in DCI
    AP-CSI-RS:
      If scheduling offset<beamSwitchTiming: the UE either aligns the TCI state with an overlapping other signal TCI state, or applies TCI state of the lowest CORESET ID in the latest slot monitored by UE
    PUCCH/SRS
      If spatial relation is not configured in FR2 determine spatial relation as follows:
        in case when CORESET(s) are configured on the Component Carriers (CC), the TCI state/QCL assumption follows the one of the CORESET with the lowest ID, or in case when any CORESETs are not configured on the CC, the activated TCI state with the lowest ID is applicable to PDSCH in the active DL-BJP of the CC PUSCH scheduled by DCI format 0_0
when there are no PUCCH resources configured on the active UL BWP CC in FR2 and in RRC-connected mode:
The default spatial relation is the TCI state/QCL assumption of the CORE SET with the lowest ID In multi-TRP scenario, TCI codepoint may comprise two TCI states and as default beam case the UE assumes the TCI states of the TCI codepoint with the lowest ID (e.g. for PDSCH)

MAC-CE based beam switching, i.e. activation of TCI state in downlink and activation of spatial relation RS in uplink follows the following principles: UE applies the new assumption 3 ms after the UE has sent the HARQ-ACK for the PDSCH carrying the MAC-CE.

During a COT, a UE does not fully know whether a gNB transmits a DL RS to be measured and reported. Delaying UE reporting to the end of COT can be vulnerable for UE detection errors (no time for retransmission) and cause scheduling challenges at the end of COT. The UE not knowing whether a gNB transmits a DL RS can lead to inaccurate UE measurements and reporting. Examples of the present disclosure may address such issues and enable improved beam management and flexibility in beam measurements (L1-RSRP) and reporting.

Also, during a first COT, a gNB may request a UE to switch to a new beam pair (e.g. so as to use the new beam pair for the next/second COT). However, if the beam switch procedure were performed at the beginning of a first COT (i.e. so that the 3 ms beam switch latency delay was still within the first COT), the switching to the new beam pair could be effected during first COT. However, it may be that the gNB is not be able to serve the new beam pair during the first COT (e.g., if the new beam was not QCLed with the LBT of the COT, i.e. the new beam is not within the spatial direction(s)/domain(s) sensed to be free by the LBT beam(s). Delaying the beam switching request to the end of a COT can be vulnerable for UE detection errors (no time for retransmission) and cause scheduling challenges at the end of COT. Hence, it is desirable to have flexibility on the time when gNB can send beam switching request without causing unnecessary scheduling restrictions. Examples of the present disclosure may address such issues and enable improved beam management and flexibility in beam switching.

Figure 2:
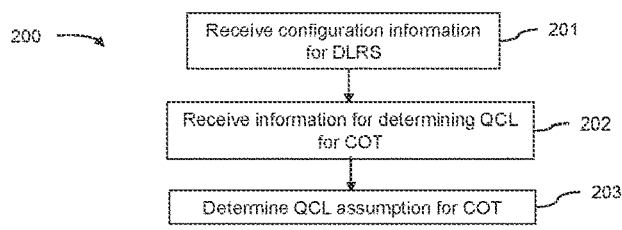
FIG. 2 shows an example of the subject matter described herein.

FIG. 2 schematically illustrates an example of a method 200 according to the present disclosure. In some examples the method is implemented by an apparatus (such as apparatus 10 discussed below and illustrated with respect to FIG. 11). In some examples the method is implemented by a UE 110.

The method steps of FIG. 2 are described below with respect to the system 300 schematically illustrated in FIG. 3 and the various DL beams and associated DLRSs shown therein, as well as the gNB 120 of FIG. 4 and the various DL beams and associated DLRSs shown therein.

In block 201, configuration information is received at an apparatus (e.g. a UE 110). The configuration information is configured (e.g. by a gNB 120) so as to enable the apparatus to measure a first set of Downlink Reference Signals (DLRSs) 302 and/or a second set of DLRSs (304). Each of the DLRSs (e.g. CSI-RSs) of the first set of DLRSs 302 are respectively associated with DL beams of a first set of DL beams 303. Likewise, each of the DLRSs (e.g. SSBs) of the second set of DLRSs 304 are respectively associated with DL beams of a second set of DL beams 305.

In the example shown, the DL beams: 303 #0-303 #4 are associated with/correspond to the beams via which the DLRSs: 302 #0-302 #4 are to be transmitted from the gNB 120 to the UE 110. Each DLRS can have a 1:1 association to their respective DL beam. Each DL RS can characterize and define its associated DL beam.

The DLRSs 302 #0-302 #4 of the first set of DLRSs 302 are respectively associated with a first set of DL beams 303, wherein one or more DLRSs 302 #1-302 #3 of the first set of DLRSs 302 are configured to be Quasi-Co-Located (QCLed) with at least one DLRS 304 #m of the second set of DLRSs 304, and wherein DLRSs 304 #a-304 #z of the second set of DLRSs 304 are respectively associated with a second set of DL beams 305.

In block 202, information is received for enabling the apparatus to determine a Quasi-Co-Location (QCL) assumption for a Channel Occupancy Time (COT). Such a COT can be a COT for the gNB, wherein the gNB had acquired channel access via a Listen-Before-Talk procedure. The QCL assumption for the COT is indicative of the availability, for use for transmissions within the COT, of: at least one DL beam 305 #m associated with the at least one DLRS 304 #m of the second set of DLRSs 304, and/or one or more DL beams 303 #1-303 #3 associated with the one or more DLRSs 302 #1-302 #3 of the first set of DLRSs 302 and QCLed with the at least one DLRS (304 #m) of the second set of DLRSs 304.

Figure 4:
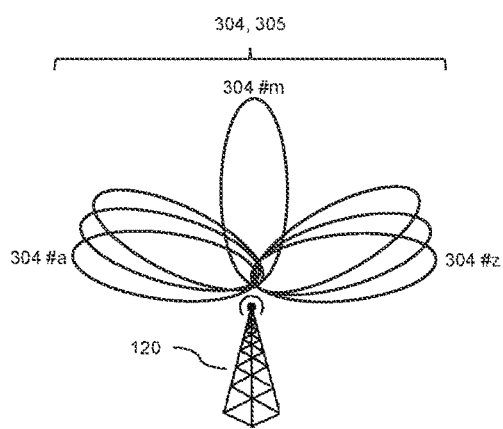
FIG. 4 shows another example of the subject matter described herein.

FIG. 4, schematically shows DLRSs 304 #a-304 #z (where a, m, and z are integer values satisfying 0<=a<=z) of the second set of DLRSs 304 which are respectively associated with a second set of DL beams 305.

Figure 3:
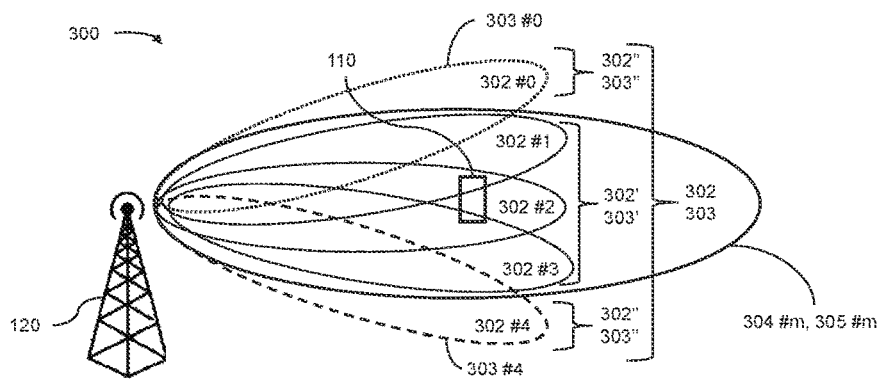
FIG. 3 shows another example of the subject matter described herein.

For the sake of clarity and simplicity, FIG. 3 only shows a single one of the DL beams of the second set of DL beams, i.e. DL beam 305 #m of the second set of DL beams. For the sake of clarity and simplicity, FIG. 4 focuses just on the second set of DLRSs 304 and their respectively associated second set of DL beams 305, and FIG. 4 does not show any of the first set of DLRSs or their respectively associated first set of DL beams.

In block 203, the QCL assumption for the COT is determined, based at least in part on the received information and configuration information. In some examples, the QCL assumption can be defined between DLRSs and one or more Uplink Reference Signals (ULRSs), e.g. SRSs. In some examples, DLRSs can act as a QCL/spatial source for UL transmission, e.g. SRS. In some examples, the UE can transmit using a TX beam corresponding to the RX beam that it used to receive a given DLRS.

The one or more DLRSs of the first set of DLRSs are configured, e.g. via a gNB, to be Quasi-Co-Located (QCLed) with the at least one DLRS of the second set of DLRSs. In the example shown with respect to FIG. 3, the DLRSs 302 #1-302 #3 of the first set of DLRSs, are configured by the gNB so as to be QCLed with DLRS 304 #m of the second set of DLRSs.

The one or more DL beams associated with the one or more DLRSs of the first set of DLRSs are configured to have a spatial directivity and/or spatial domain based, at least in part, on a spatial directivity and/or spatial domain of the at least one DL beam associated with the at least one DLRS of the second set of DLRSs. In the example shown with respect to FIG. 3, the DL beams 303' (i.e. 303 #1-303 #3) associated with the DLRSs 302' (i.e. 302 #1-302 #3) of the first set of DLRSs 302 are configured, by the gNB, to have a spatial directivity and/or spatial domain based, at least in part, on a spatial directivity and/or spatial domain of the DL beam 305 #m associated with the DLRS 304 #m of the second set of DLRSs 304.

The spatial directivity and/or spatial domain of the at least one DL beam associated with the at least one DLRS of the second set of DLRSs is based, at least in part, on a spatial directivity and/or spatial domain of a directional Listen Before Talk (LBT) measurement. In this regard, in effect, the spatial directivity and/or spatial domain (e.g. beamwidth) of the at least one DL beam associated with the at least one DLRS of the second set of DLRSs corresponds to the spatial directivity and/or spatial domain of the at least one directional beams via which the LBT measurements were taken (referred to as LBT beams), and hence correspond to the spatial directivity and/or spatial domain valid for use during a COT following channel acquisition via the LBT procedure. In the example shown with respect to FIG. 3, the spatial directivity and/or spatial domain of the DL beam 305 #m associated with the DLRS 304 #m of the second set of DLRSs 304 corresponds, at least in part, on a spatial directivity and/or spatial domain of one or more directional Listen Before Talk (LBT) measurements indicating a vacant channel, referred to herein as an 'LBT beam'. Accordingly, in effect, the DL beam 305 #m corresponds to the LBT beam used in the LBT procedure and hence it also corresponds to the beam that can validly be used during a COT following channel access via the LBT procedure. The DLRS 304 #m can thereby characterize and define the LBT beam and the permitted directivity and spatial extend of beams that can be used for subsequent transmissions during COT between the gNB and UE.

The first set of DLRSs 302 can comprises at least one selected from the group of:
 a set of RSs based on which the apparatus is able to configure a DL receive beam and/or an UL transmit beam of the apparatus,
 a set of spatially QCLed RSs,
 a set of TypeD QCLed RSs,
 a set of Channel State Information Reference Signals (CSI-RSs),
 a set of Synchronization Signal Blocks (SSBs), and
 a set of CSI-RSs wherein one or more of the set of CSI-RSs is TypeD QCLed with at least one SSB.

The second set of DLRSs 305 can comprises a set of Synchronization Signal Blocks (SSBs).

The information for enabling the apparatus to determine the QCL assumption for the COT can comprises at least one selected from the group of:
 information indicative of at least one DLRS index of the at least one DLRS of the second set of DLRSs; and/or
 information indicative of an SSB index or SSB indexes.

The apparatus (e.g., the UE) can perform DLRS measurements during the COT based at least in part on the QCL assumption for the COT. For example, the apparatus can be configured by a gNB, based at least in part on the configuration information, to be able to measure on resources configured for the first set of DLRSs and/or measure on resources configured for the second set of DLRSs. The apparatus can select, based at least in part on the QCL assumption for the COT, one or more of the configured measurement resources for the first set of DLRSs for the COT and/or one or more of the configured measurement resources for the second set of DLRSs for the COT. Such selected resources may be those deemed to be valid for use during the COT. For example, with respect to FIG. 3, based on the QCL assumption for the COT indicating DLRS #m, the DLRS of the first set of DLRSs which are QCLed with DLRS #m can be determined, namely DLRSs 302' (i.e. DLRS 302 #1-302 #3). As shown in FIG. 3, each of the respective associated DL beams 303' (i.e. DL beams 303 #1-303 #3) have a directivity and spatial domain that is within the DL beam 305 #m associated with the DLRS 304 #m, such a DL beam 305 #m effectively defining the directivity and spatial domain of the directional LBT beam used in a LBT channel access procedure. Hence the DL beams 303' (and their associated respective DLRSs 302' as well as their respective configured resources) correspond to those that are permitted/valid/suitable for use during the COT of the gNB. Whereas, the DL beams 303" (and their associated respective DLRSs 302" (i.e. 302 #0 and 302 #4) as well as their respective configured resources) correspond to those that are not permitted/invalid/unsuitable for use during the COT of the gNB.

Having identified/selected the configured resources for the DLRSs that are valid for use during the COT, i.e. DLRS 302', the apparatus may perform DLRS measurements using the selected configured measurement resources for the same. In this regard, measurements are only performed on a subset 302' of the first set 302 of configured DLRSs, namely those determined to be valid/allowed for the COT. Measurements are only performed for valid/allowed DLRSs 302' and no measurements are performed for invalid/disallowed DLRSs 302".

A measurement report for the DLRS measurements can be transmitted to the gNB, wherein the measurement report is likewise limited only to the valid DLRSs 302' that have been measured.

Advantageously, such control of which DLRS's are measured and reported can save resources, not least such as power and bandwidth/network radio resources. The UE is able to determine which DLRSs (e.g. which DLRSs of the first and/or second set of DLRSs) are to be measured and reported within a COT. This can avoid/reduce the risk of inaccurate or erroneous UE measurements and reporting. It can also avoid/reduce scheduling challenges at the end of COT.

The determination of which DL beams of the first and/or second set of DL beams that are valid/permitted for a given COT (and the determination of the associated DLRS's and resources for the same) can also be used to control the UE's UL transmissions and UL beams during the COT. In this regard, a ULRS/UL beam can be determined based on a DLRS/DL beam (i.e. a TX beam to be used may correspond to a RX beam that was used to receive a DLRS). The apparatus can preclude, during the COT, transmission from the apparatus via one or more UL transmission beams corresponding to the one or more DL beams associated with the one or more DLRSs of the first set of DLRSs.

In some examples, the apparatus (e.g., the UE) is configured to determine whether to perform a beam switch during the COT based at least in part on the QCL assumption for the COT.

In this regard, the apparatus receives a command for the apparatus to switch to using a new DL beam, wherein the new DL beam is associated with one of the DLRSs of the first and/or second set of DLRSs. The apparatus uses the QCL assumption for the COT to determine whether said one of the DLRSs of the first set of DLRSs is QCLed with the at least one DLRS of the second set of DLRSs.

Responsive at least in part to determining the DLRS of the first set of DLRSs is QCLed with the at least one DLRS of a second set of DLRSs, the apparatus switches to the new beam during the COT.

In some examples, the apparatus may further determine whether or not to switch to the new beam based, at least in part, on a beam switch latency, i.e. a period of time in which it takes the apparatus to switch beams. In this regard, the apparatus may be configured to determine the beam switch latency.

In some examples, the apparatus determines whether the new beam is one of the at least one DL beam used for transmission within the COT, based at least in part on:
the QCL assumption for the COT,
the one or more DLRs of the first set of DLRSs, and/or
the at least one DLRS of the second set of DLRSs.

Responsive at least in part to determining the new beam is one of the at least one DL beam used for transmission within the COT, the apparatus switches to the new beam within the COT. Whereas, responsive at least in part to determining the new beam is not one of the at least one DL beam used for transmission within the COT, the apparatus switches to the new beam after the COT.

In some examples, the apparatus is configured, e.g. by the gNB, with measurement resources for the first set of DLRSs and the apparatus performs DLRS measurements for all of the DLRSs of the first set of DLRSs during the COT (i.e. unlike the above described example wherein measurements are performed only for the DLRS's determined to be valid for the COT. However, the reporting of the measurements is based on the QCL assumption for the COT. In this regard, the apparatus selects, based at least in part on the QCL assumption for the COT, one or more of the DLRS measurements and/or on the at least one DLRS of the second set of DLRSs for transmitting in a measurement report. The priority of the reporting order may be adjusted depending on whether the DLRS measurements correspond to those DLRSs deemed valid, e.g. 302'.

The apparatus can also determine a remaining duration of the COT (this can be signalled to the apparatus by the gNB) and the selection of the one or more DLRSs measurements for transmitting in a measurement report can be further based, at least in part, on the remaining duration of the COT.

FIG. 5A schematically illustrates an example method 500 according to the present disclosure. FIG. 5B is a signalling diagram for signalling, between a gNB 120 and UE 110, that may be used with the method 500 of FIG. 5A. FIG. 7 schematically illustrates various DLRSs, DL beams and resources involved in the method 500 of FIG. 5A.

In block 501 of the method 500, the UE 110 receives from the gNB 120 configuration for enabling the UE to perform beam measurements. In the example of FIG. 7, the UE (not shown) may be configured with resources, e.g. CSI-RS resources #0-#4. When configuring the CSI-RS resources, the gNB gives a QCL assumption for each resource. For example:

CSI-RS #0→SSB #d

CSI-RS #1→SSB #a

CSI-RS #2→SSB #a

CSI-RS #3→SSB #a

CSI-RS #4→SSB #e

In this regard, with regards to signal 601 of the signalling, the gNB transmits configuration information for enabling the UE to perform measurements. Such configuration information can include an indication of beams to be measured, e.g. beam indices such as SSB indices and/or CSI-RS indices, and configured resources for the UE to measure such beams.

In block 502 of the method, the UE determines a QCL assumption for a COT. In some examples, the UE can also determine QCLs for subsequent COTs.

In this regard, with regards to signal 602 of the signalling, the gNB signals an indication of an initiation of a COT for the gNB. This may be signalled via a DCI or via transmission of discovery signal or predefined reference signal. The gNB also signals a QCL assumption for the COT. The indication and the QCL assumption may also be signalled via the DCI which is included in PDCCH, GC-PDCCH, PDSCH, or short control signal.

When a DCI transmitted, for example on PDCCH and GC-PDCCH, indicates the QCL assumption for the COT, the indication may contain:
a predefined number of SSB indexes (representing QCL assumptions). Such one or more SSB indexes may indicate one or more SSBs whose directivity and spatial domain effectively correspond to directivity and spatial domain of a directional LBT beam used by the gNB in an LBT procedure such that the one or more SSBs effectively define the LBT beam),
a bitmap over a configured subset of SSB indexes associated with the received DCI (e.g. associated with a CORESET on which the DCI is detected),
an indication of an SSB group, wherein the UE is configured with a number of SSB groups that are associated with a CORESET for the DCI. The SSB groups may be partially overlapping or nested. The DCI may contain an indication of the SSB group that can be used as QCL assumption for the COT,
the first SSB index and the last SSB index in case of consecutive SSB indexes. This helps to reduce the number of bits to indicate the QCL assumption in the case where an LBT beamwidth does not coincide with an SSB group.

The QCL assumption for a COT may mean that a determined set of QCL chains, associated to a set of SSBs, are used and valid within the COT.

The UE may be signalled the COT's QCL assumption in the GC-PDCCH. In this regard, DCI transmitted as GC-PDCCH may have a field indicating the COT's QCL assumption, which could be in form of an SSB index or SSB indexes. This can be in the form of TCI states where same or different spatial filters can be used for the reception and transmission at the UE.

The GC-PDCCH may be transmitted in the beginning of the COT and/or GC-PDCCH content may be updated during the COT.

The UE may also determine QCL assumption from the higher layer configuration, e.g. there could be scenarios where COTs are having some predefined QCL assumption e.g. when UE detects gNB COT on a given beam pair, it can make higher layer configured QCL assumption that is associated to the given beam pair.

The determination of QCL assumption may comprise a determination that a certain QCL assumption (a second QCL assumption) is QCLed with the QCL assumption of the COT (a first QCL assumption).

The second QCL assumption is QCLed with the first QCL assumption if: the first QCL assumption is in the same QCL chain as the second QCL assumption, and the first QCL assumption is before or in the same node in the QCL chain.

A QCL chain is defined by a chain of TCI states where a first node in the chain comprises an SSB as QCL-TypeD RS (first QCL assumption) and the QCL-TypeD RS of the next TCI state has a first TCI state as the QCL source, and so on. An example of a QCL chain with an SSB defining a root node of the chain is depicted in FIG. 6. In FIG. 6, SSB #3 corresponds to a "root" beam having the widest beam. CSI-RS #4 corresponds to either a similar beam to that of SSB #3's beam or a narrower beam that is within SSB #3's beam in a spatial domain. CSI-RS #11 corresponds to a narrower beam that is within CSI-RS #4's beam in the spatial domain. In this regard, the chain also represents a hierarchical beam configuration from wider towards narrower beams, wherein a narrow beam (i.e. a next level in the chain) is within the previous beam in the spatial domain.

In block 503 of the method, the UE determines which configured measurement resources are valid within COT. Such a determination is based, at least in part on the QCL assumption determined in block 502.

In the example of FIG. 7, the indication of the QCL assumption for the COT is SSB index #a. Based on the configuration of the CSI-RS resources:

CSI-RS #0→SSB #d

CSI-RS #1→SSB #a

CSI-RS #2→SSB #a

CSI-RS #3→SSB #a

CSI-RS #4→SSB #e

It can be determined that CSI-RS resources #1-#3 are valid resources for the COT, and beams associated with such CSI-RSs are valid beams that are available for use for transmissions during the COT. In other words, such beams are within the beamwidth(s) of the directional LBT beam(s) that were used in one or more directional Listen Before Talk (LBT) measurements indicating a vacant channel. The at least one directional LBT beams are indicated by the at least one DLRS of the second set of DLRSs (e.g. an SSB index or a set of SSB indices), in this case the directional LBT beam is indicated by SSB #a. In this regard, the validation can, in effect, relate to a spatial validation (e.g. whether the beams associated with CSI-RSs #1-#3 are within the beam associated with SSB #a) and a temporal validation (i.e. for the particular COT).

The configured resources with QCL assumptions that are not QCLed with the determined QCL assumption (e.g. SSB) of the COT are considered to be (temporarily) invalid within the COT. Validation can be done for both downlink and uplink resources.

Validation can help to avoid/reduce erroneous measurements and L1-RSRP reporting for DL measurement resources that are not QCLed with the determined QCL assumption of the COT. In some examples, the gNB does not transmit any invalid DL RSs on those resources during the COT, In other examples, SCS allowance can be used, i.e. without LBT, so that DLRSs outside of the COT's QCL assumption are transmitted during the COT via SCS, i.e. so that such DLRSs are transmitted regardless of the COT QCL assumption and can be used for measurement.

Validation is important also for uplink resources so that UE does not access channel towards directions on which the gNB has not acquired channel access.

In block 504, the UE performs measurements on the measurement resources that have been determined to be valid.

In this regard, with regards to signal(s) 603 of the signalling, the gNB transmits reference signals. In some examples, the gNB transmits the reference signals on only the valid resources. In this regard, with regards to signal(s) 603 of the signalling, the gNB transmits reference signals. In other examples, SCS allowance can be used, i.e. without LBT, so that DLRSs outside of the COT's QCL assumption are transmitted during the COT via SCS, i.e. so that such DLRSs are transmitted regardless of the COT QCL assumption and can be used for measurement.

In block 505, the UE signals a measurement report of the measurements (e.g. RSRP) on the resources that have been determined to be valid.

In this regard, with regards to signal 604 of the signalling, the UE 110 transmits to the gNB 120 a measurement report of the measurements on the resources that have been determined to be valid.

It is to be appreciated that the above-described process may be repeated for each of COTs of the gNB and that, for each COT, the beams that are valid/allowed and the beams that are invalid/not allowed may vary.

For example, in a first COT, COT1, SSB #a may be signalled to indicate the QCL assumption for COT1, which thereby indicates that the beams associated with CSI-RS #1-#3 are valid/allowed/suitable for use in transmission during COT1, whereas beams associated with CSI-RS #0 and #4 are not. However, in a subsequent COT, COT2, SSB #d may be indicated as to be supposed to have the QCL assumption for COT2, which thereby indicates that the beam associated with CSI-RS #0 is valid/allowed/suitable for use in transmission during COT2, whereas beams associated with CSI-RS #1-#4 are not. Likewise, SSB #e may be indicated as to be supposed to have the QCL assumption for COT3, which thereby indicates that the beams associated with CSI-RS #4 are valid/allowed/suitable for use in transmission during COT3, whereas beams associated with CSI-RS #0-#3 are not. In COT4, SSB #a may be indicated as to be supposed to have the QCL assumption for COT4, such that the valid and invalid beams are as per those of COT1.

With regards to the UE's QCL assumptions for the PDCCH monitoring between the COTs, the gNB and the UE would maintain a set of TCI states at the end of the COT transmission, with the understanding that these TCI states are going to be used, in an orderly manner, when COT transmission resumes. The UE is configured with one or multiple CORESETs each associated with one or more search space sets. The search space sets define when the UE monitors PDCCH candidates in the certain CORESET and current activated TCI state of the CORESET defines the QCL assumption the UE uses for the monitoring.

This implies that when COT transmission resumes, the first transmission attempt is going to use the first TCI state (likely the last one used during the previous COT), if this fails, second TCI state assumptions are used, and so on. This procedure gives access to both gNB and UE to a set of beam pairs to be used when COT transmission resumes.

Such a TCI state update can be updated at the end of the COT by allowing the typical set of BM alignment procedures. The TCI update can happen via higher layer or can be overridden by DCI transmission, also via GC-PDCCH. It is understood that due to limited time for COT transmission, it might not be possible perform higher layer transmission via MAC CE after the latest stage of BM procedures, hence the system would utilise the fastest approach based on DCI which would update only the COT states needed to resume the transmission, not necessarily all the TCI states. All TCI states may be updated if a small number of these are utilised by the gNB and UE.

FIG. 8A schematically illustrates an example method 800 according to the present disclosure. FIG. 8B is a signalling diagram for signalling, between a gNB 120 and UE 110, that may be used with the method 800 of FIG. 8A, FIG. 9 schematically illustrates various DLRSs, DL beams and resources involved in the method 800 of FIG. 8A.

In block 801 of the method, the UE receives from the gNB 120 configuration for enabling the UE to perform beam measurements, i.e. as per block 501 of FIG. 5A.

In this regard, with regards to signal 901 of the signalling, the gNB transmits configuration information for enabling the UE to perform measurements, i.e. as per signal 601 of FIG. 5B.

In block 802 of the method, the UE determines a QCL assumption for a COT, i.e. as per block 502 of FIG. 5A.

In this regard, with regards to signal 802 of the signalling, the gNB signals an indication of an initiation of a COT and a QCL assumption for the COT, i.e. as per signal 602 of FIG. 5B.

In optional block 803 of the method, the UE may perform measurements on the configured measurement resources and signals a measurement report of the same to the gNB. In this case, in some examples, the UE may perform the measurements by using all the CSI-RSs configured by the received configuration. In other examples, the UE may perform the measurements by using valid CSI-RSs of the COT.

In this regard, with regards to optional signals 903 and 904 of the signalling, the gNB may transmit reference signals, using the configured resources, that are measured by the UE and the UE may send a measurement report for the same.

The UE may report the (index and the L1-RSRP of the) strongest DL RSs (e.g. the best ones from the configured SSBs and/or CSI-RSs) during the COT. Based on the reports, the gNB may decide to switch the beam (i.e. change TCI state in downlink).

In block 804, the UE receives a beam switching command, i.e. to switch from a currently serving beam, e.g. Beam #2 as shown in the example of FIG. 9, to a new beam, e.g. a new beam with better channel conditions/higher RSRP, such as Beam #0 or Beam #4.

In this regard, with regards to signal 905 of the signalling, the UE receives a beam switching command.

In block 805, responsive to receipt of the beam switching command, the UE determines a beam switching latency and performs beam switching.

If the beam switching latency/beam switching application latency would allow the UE take the new beam into use within the COT, and the new beam is determined to be QCLed with the COT QCL assumption (e.g. if the new beam were determined to be Beam #3), the UE applies the existing beam application latency.

The determination can be explicit, i.e. the beam switching command (like MAC-CE) indicates to the UE that beam switching takes place within the COT, if the normal/existing application latency allows that.

The determination can be implicit, i.e. the UE determines whether or not the CSI-RS of the new beam are associated with an SSB that is used as a QCL assumption for the COT.

Otherwise, i.e. in the case that the new beam is determined not to be QCLed with the COT's QCL assumption (e.g. if the new beam were determined to be Beam #0), the UE determines the application time for the beam switch being at earliest at the end of the current COT (or at the end of the time period the current COT QCL assumption is in effect).

In one example method similar to that of FIG. 8A, the following steps occur:
1. The UE receives configuration of TCI states and spatial relation information for downlink signals and channels prior to the COT of interest.
2. The UE receives activation of the TCI state(s) for different DL signals and channels and activation of the spatial relation information for different UL signal and channel resources for the COT of interest.
   a. This also includes activation of a TCI state for the CORESET(s) for PDCCH monitoring, e.g. for GC-PDCCH monitoring.
3. The UE receives configuration for SSB indices and/or CSI-RS resources for L1-RSRP measurements and reporting prior to the COT of interest.
4. The UE receives configuration to monitor GC-PDCCH at least for the start of the COT (COT detection based on GC-PDCCH).
5. The UE detects the start of the COT.
   a. The UE receives, from the DCI transmitted on GC-PDCCH, the QCL assumption for the COT.
      i. The QCL assumption could be e.g. an SSB index.
6. The UE may report N best SSB and/or CSI-RS resources with their L1-RSRP values (N=1, 2, 3 or 4).
7. The UE receives activation of the new TCI state for downlink channel, e.g. for a CORESET, and/or activation of new spatial relation RS for uplink channel(s), e.g. for set of PUCCH resources.
8. The UE determines whether or not the QCL-TypeD RS of the new TCI state or spatial source RS of the new spatial relation info is QCLed with the COT QCL assumption.
   a. In case yes, the UE applies the existing beam switch timing and applies the new TCI state or spatial relation info if time allows within the current COT.
   b. In case no, the uses the old TCI state or spatial relation until the end of the current COT and applies the new ones only when the new COT is established It is possible that at least SSBs are transmitted as short control signals without channel sensing. In this case, the UE may use SSB as the configured measurement resources as those remain valid irrespective of QCL assumption of the COT. In this case, UE may report measurements for SSBs outside COT QCL assumption and gNB may indicate a beam (TCI state) switch for next COT to a beam pair that is not served during the COT.

It is possible that NR-U (New Radio in unlicensed bands) may not support short control signalling without LBT, in this case the UE needs to know which of the configured measurement resources are valid during the COT.

FIG. 10A schematically illustrates an example method 1100 according to the present disclosure. FIG. 10B is a signalling diagram for signalling, between a gNB 120 and UE 110, that may be used with the method 1100 of FIG. 10.

In block 1101 of the method, the UE 110 receives from the gNB 120 configuration for enabling the UE to perform beam measurements, i.e. as per block 501 of FIG. 5A.

In this regard, with regards to signal 1201 of the signalling, the gNB transmits configuration information for enabling the UE to perform measurements, i.e. as per signal 601 of FIG. 5B.

In block 1102 of the method, the UE determines a QCL assumption for a COT, i.e. as per block 502 of FIG. 5A.

In this regard, with regards to signal 1202 of the signalling, the gNB signals an indication of an initiation of a COT and a QCL assumption for the COT, i.e. as per signal 602 of FIG. 5B.

In block 1103 of method, the UE performs measurements of the configures measurement resources and signals a measurement report of the same to the gNB.

In this regard, with regards to signal(s) 1203 of the signalling, the gNB transmits reference signals, using the configured resources, that are measured by the UE.

In block 1104 of the method, the UE determines a L1-RSRP report taking into account QCL assumption for the COT(s) and, possibly, remaining duration of current COT.

In this regard, with regards to signal 1204 of the signalling, the UE signals the measurement report to the gNB.

When reporting the measurement results, UE prioritizes the beams that are used and valid within the COT.

The UE reports the L1-RSRP of {1, 2, 3 or 4} best SSBs or CSI-RSs per report configuration.

If there is more than a predetermined period of time (e.g. 3 ms) until the end of the current COT, the UE includes in this report one or more of the beams that are valid within the COT.

If the UE reports the measurements (to requests the beam switch), it may apply certain weight coefficients to prioritize the beams that are valid within the COT. For example, if the 4 best SSBs are NOT valid within the COT, while the 5th best SSB (not to be reported originally) is valid within the COT and is also only slightly worse than the best 4, then UE may report this 5th beam instead of one of the others. This way, a continuous UE service within the current COT is maintained. In contrast, if all the beams that are valid within the COT are significantly worse than another beam(s), the UE can still report the best SSBs (even not valid within the current COT) and continue transmitting/receiving the data once the new COT is established.

The weight coefficients/decision making at the UE side may depend on one or more of the following characteristics:
(i) the remaining time of the current COT,
(ii) the number of SSBs that UE reports,
(iii) higher layer requirements for the latency/continuity of the ongoing traffic, and
(iv) the difference between the L1-RSRP of the best SSB(s) not valid within the COT and the best SSB(s) valid within the COT.

In one option, the gNB informs the UE also with the next COT(s) and its (their) QCL assumption(s) that the UE may take into account in above-described weighting of the SSBs or CSI-RSs to be reported.

The flowcharts of FIGS. 2, 5A, 8A and 10A each represent one possible scenario among others. The order of the blocks shown is not absolutely required, so in principle, the various blocks can be performed out of order. Not all the blocks are essential. In certain examples one or more blocks can be performed in a different order or overlapping in time, in series or in parallel. One or more blocks can be omitted or added or changed in some combination of ways.

The blocks illustrated in FIGS. 2, 5A, 8A and 10A are functional and the functions described may or may not be performed by a single physical entity (such as an apparatus described with reference to FIG. 11.

The blocks illustrated in FIGS. 2, 5A, 8A and 10A can represent actions in a method, and/or sections of instructions/code in a computer program (such as described with reference to FIG. 12).

It will be understood that each block and combinations of blocks, can be implemented by various means, such as hardware, firmware, and/or software including one or more computer program instructions. For example, one or more of the procedures described above can be embodied by computer program instructions. In this regard, the computer program instructions which embody the procedures described above can be stored by a memory storage device and performed by a processor.

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions: combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

FIG. 11 schematically illustrates a block diagram of an apparatus 10 for performing the methods, processes, procedures and signalling described in the present disclosure and illustrated in FIGS. 2, 5A, 8A and 10A. The component blocks of FIG. 2 are functional and the functions described may or may not be performed by a single physical entity.

The apparatus comprises a controller 11, which could be provided within a device such as a UE 110, or a RAN node 120. The controller 11 can be embodied by a computing device, not least such as those mentioned above. In some, but not necessarily all examples, the apparatus can be embodied as a chip, chip set or module, i.e. for use in any of the foregoing. As used here 'module' refers to a unit or apparatus that excludes certain parts/components that would be added by an end manufacturer or a user.

Implementation of the controller 11 may be as controller circuitry. The controller 11 may be implemented in hardware alone, have certain aspects in software including firmware alone or can be a combination of hardware and software (including firmware).

The controller 11 may be implemented using instructions that enable hardware functionality, for example, by using executable instructions of a computer program 14 in a general-purpose or special-purpose processor 12 that may be stored on a computer readable storage medium 13, for example memory, or disk etc. to be executed by such a processor 12.

The processor 12 is configured to read from and write to the memory 13. The processor 12 may also comprise an output interface via which data and/or commands are output by the processor 12 and an input interface via which data and/or commands are input to the processor 12. The apparatus may be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated in FIGS. 2, 5A, 8A and 10A. The processor 12 by reading the memory 13 is able to load and execute the computer program 14.

Although the memory 13 is illustrated as a single component/circuitry it may be implemented as one or more separate components/circuitry some or all of which may be integrated/removable and/or may provide permanent/semi-permanent/dynamic/cached storage.

Although the processor 12 is illustrated as a single component/circuitry it may be implemented as one or more separate components/circuitry some or all of which may be integrated/removable. The processor 12 may be a single core or multi-core processor.

The apparatus may include one or more components for effecting the methods, processes and procedures described in the present disclosure and illustrated in FIGS. 2, 5A, 8A and 10A. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

The apparatus 10 may be the UE 110 or the gNB 120. In this case, the apparatus 10 may work as one of the UE 110 or the gNB 120 of FIGS. 5B, 8B and 10B.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e. for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In some examples, the apparatus comprises:
at least one processor 12; and
at least one memory 13 including computer program code
the at least one memory 13 and the computer program code configured to, with the at least one processor 12, cause the apparatus at least to perform:
receiving configuration information for enabling an apparatus to measure a first set of Downlink (DL) Reference Signals (RSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
receiving information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at feast one DLRS of the second set of DLRSs, and
one or more DL beams associated with the one or more DLRSs of the first set of DLRSs and QCLed with the at least one DLRS of the second set of DLRS; and determining, based at least in part on the received information and configuration information, the QCL assumption for the COT.

The apparatus may be provided within a UE 110.

In examples, the apparatus comprises:
at least one processor 12; and
at least one memory 13 including computer program code
the at least one memory 13 and the computer program code configured to, with the at least one processor 12, cause the apparatus at least to perform:
  sending configuration information for enabling a second apparatus to measure a first set of Downlink (DL) Reference Signals (RSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and
  sending information for enabling the apparatus to determine a Quasi-Co-Location (QCL) assumption for a Channel Occupancy Time (COT), wherein the QCL assumption for the COT is indicative of the availability, for use for transmissions within the COT, of:
    at least one DL beam associated with the at least one DLRS of the second set of DLRSs, and
    one or more DL beams associated with the one or more DLRSs of the first set of DLRSs and QCLed with the at least one DLRS of the second set of DLRS.

The apparatus may be provided within a RAN node 120. The second apparatus may be provided within a UE 110.

According to some examples of the present disclosure, there is provided a system (for example at least one UE 110 and a RAN node 120).

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

FIG. 12, illustrates a computer program 14. The computer program may arrive at the apparatus 10 (e.g., the UE 110 or the gNB 120) via any suitable delivery mechanism 20. The delivery mechanism 20 may be, for example, a machine readable medium, a computer-readable medium, a non-transitory computer-readable storage medium, a computer program product, a memory device, a solid state memory, a record medium such as a Compact Disc Read-Only Memory (CD-ROM) or a Digital Versatile Disc (DVD) or an article of manufacture that comprises or tangibly embodies the computer program 14. The delivery mechanism may be a signal configured to reliably transfer the computer program. The apparatus 10 may receive, propagate or transmit the computer program as a computer data signal.

In certain examples of the present disclosure, there is provided computer program instructions for causing an apparatus to perform at least the following or for causing performing at least the following:
  receiving configuration information for enabling the apparatus to measure a first set of Downlink (DL) Reference Signals (RSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
  receiving information for enabling the apparatus to determine a Quasi-Co-Location (QCL) assumption for a Channel Occupancy Time (COT), wherein the QCL assumption for the COT is indicative of the availability, for use for transmissions within the COT, of:
    at least one DL beam associated with the at least one DLRS of the second set of DLRSs, and
    one or more DL beams associated with the one or more DLRSs of the first set of DLRSs and QCLed with the at least one DLRS of the second set of DLRS; and
  determining, based at least in part on the received information and configuration information, the QCL assumption for the COT.

In some examples, the apparatus is a UE 110.

In certain examples of the present disclosure, there is provided computer program instructions for causing an apparatus to perform at least the following or for causing performing at least the following:
  sending configuration information for enabling a second apparatus to measure a first set of Downlink (DL) Reference Signals (RSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams; and
  sending information for enabling the second apparatus to determine a Quasi-Co-Location (QCL) assumption for a Channel Occupancy Time (COT), wherein the QCL assumption for the COT is indicative of the availability, for use for transmissions within the COT, of:
    at least one DL beam associated with the at least one DLRS of the second set of DLRSs, and
    one or more DL beams associated with the one or more DLRSs of the first set of DLRSs and QCLed with the at least one DLRS of the second set of DLRS.

In some examples, the apparatus is a RAN node 120 and the second apparatus is a UE 110.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
(c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the present disclosure as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter can be replaced by references to "data indicative or", "data defining" or "data representative of" the relevant parameter if not explicitly stated.

In this description, reference has been made to various examples. The description of features or functions in relation to an example indicates that those features or functions are present in that example. The use of the term 'example' or for 'example', 'can' or 'may' in the text denotes, whether explicitly stated or not, that such features or functions are present in at least the described example, whether described as an example or not, and that they can be, but are not necessarily, present in some or all other examples. Thus 'example', 'for example'. 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

The invention claimed is:

1. An apparatus comprising:
at least one processor; and
at least one memory including computer program instructions;
the at least one memory and the computer program instructions configured to, with the at least one processor, cause the apparatus at least to perform:
receiving configuration information for enabling the apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;
receiving information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS; and
determining, based at least in part on the received information and configuration information, the QCL assumption for the COT.

2. The apparatus as claimed in claim 1, wherein one or more DL beams associated with the one or more DLRSs of the first set of DLRSs are configured to have a spatial directivity and/or spatial domain based, at least in part, on a spatial directivity and/or spatial domain of the at least one DL beam associated with the at least one DLRS of the second set of DLRSs.

3. The apparatus as claimed in claim 2, wherein the spatial directivity and/or spatial domain of the at least one DL beam corresponds to, at least in part, a spatial directivity and/or spatial domain of one or more directional Listen Before Talk (LBT) measurements indicating a vacant channel.

4. The apparatus as claimed in claim 1, wherein the first set of DLRSs comprises at least one selected from the group of:
a set of RSs based on which the apparatus is able to configure a DL receive beam and/or an UL transmit beam of the apparatus,
a set of spatially QCLed RSs,
a set of TypeD QCLed RSs,
a set of Channel State Information Reference Signals (CSI-RSs),
a set of Synchronization Signal Blocks (SSBs), and
a set of CSI-RSs wherein one or more of the set of CSI-RSs is TypeD QCLed with at least one SSB.

5. The apparatus as claimed in claim 1, wherein the information for enabling the apparatus to determine the QCL assumption for the COT comprises at least one selected from the group of:
information indicative of at least one DLRS index of the at least one DLRS of the second set of DLRSs; and/or
information indicative of an SSB index or SSB indexes.

6. The apparatus as claimed in claim 1, wherein the at least one memory and the computer program instructions are configured to, with the at least one processor, cause the apparatus at least to perform:
performing, during the COT and based at least in part on the QCL assumption for the COT, DLRS measurements for the one or more DLRs of the first set of DLRSs and/or the at least one DLRS of the second set of DLRSs.

7. The apparatus as claimed in claim 1, wherein the at least one memory and the computer program instructions are configured to, with the at least one processor, cause the apparatus at least to perform:
selecting, based at least in part on the QCL assumption for the COT, one or more measurement resources for the first set of DLRSs for the COT.

8. The apparatus as claimed in claim 7, wherein the at least one memory and the computer program instructions are configured to, with the at least one processor, cause the apparatus at least to perform:

performing DLRS measurements using the selected measurement resources; and transmitting a measurement report of the DLRS measurements.

9. The apparatus as claimed in claim 1, wherein the at least one memory and the computer program instructions are configured to, with the at least one processor, cause the apparatus at least to perform:

precluding, during the COT, transmission from the apparatus via UL transmission beams other than one or more UL transmission beams corresponding to the one or more DL beams associated with the one or more DLRSs of the first set of DLRSs.

10. The apparatus as claimed in claim 1, wherein the at least one memory and the computer program instructions are configured to, with the at least one processor, cause the apparatus at least to perform:

determining whether to perform a beam switch during the COT based at least in part on the QCL assumption for the COT.

11. The apparatus as claimed in claim 1, wherein the at least one memory and the computer program instructions are configured to, with the at least one processor, cause the apparatus at least to perform:

receiving a command for the apparatus to switch to using a new beam, wherein the new beam is associated with a DLRS of the first set of DLRSs;

determining whether the new beam is one of the at least one DL beam used for transmission within the COT, based at least in part on:
the QCL assumption for the COT,
the one or more DLRSs of the first set of DLRSs, and/or
the at least one DLRS of the second set of DLRSs; and switching, responsive at least in part to determining the new beam is one of the at least one DL beam used for transmission within the COT, to the new beam within the COT.

12. The apparatus as claimed in claim 1, wherein the at least one memory and the computer program instructions are configured to, with the at least one processor, cause the apparatus at least to perform:

receiving a command for the apparatus to switch to using a new beam, wherein the new beam is associated with a DLRS of the first set of DLRSs;

determining whether the new beam is one of the at least one DL beam used for transmission within the COT, based at least in part on:
the QCL assumption for the COT,
the one or more DLRSs of the first set of DLRSs, and/or
the at least one DLRS of the second set of DLRSs; and switching, responsive at least in part to determining the new beam is not one of the at least one DL beam used for transmission within the COT, to the new beam after the COT.

13. The apparatus as claimed in claim 11, wherein the at least one memory and the computer program instructions are configured to, with the at least one processor, cause the apparatus at least to perform:

determining a beam switch latency of the apparatus;
wherein the switching to the new beam within the COT is further based, at least in part, on the beam switch latency.

14. The apparatus as claimed in claim 12, wherein the at least one memory and the computer program instructions are configured to, with the at least one processor, cause the apparatus at least to perform:

determining a beam switch latency of the apparatus;
wherein the switching to the new beam within the COT is further based, a least in part, on the beam switch latency.

15. The apparatus as claimed in claim 1, wherein the at least one memory and the computer program instructions are configured to, with the at least one processor, cause the apparatus at least to perform:

configuring, based at least in part on the configuration information, the apparatus with measurement resources for the first set of DLRSs; and performing DLRS measurements for the first set of DLRSs using measurement resources.

16. The apparatus as claimed in claim 1, wherein the at least one memory and the computer program instructions are configured to, with the at least one processor, cause the apparatus at least to perform:

selecting, based at least in part on the QCL assumption for the COT, one or more DLRS measurements on the one or more DLRS of the first set of DLRSs, and/or on the at least one DLRS of the second set of DLRSs, for transmitting in a measurement report.

17. The apparatus as claimed in claim 1, wherein the at least one memory and the computer program instructions are configured to, with the at least one processor, cause the apparatus at least to perform:

biasing, based at least in part on the QCL assumption for the COT, DLRS measurements on the one or more DLRS of the first set of DLRSs, and/or on the at least one DLRS of the second set of DLRSs, in a selection of DLRS measurements for transmitting in a measurement report.

18. The apparatus as claimed in claim 14, wherein the at least one memory and the computer program instructions are configured to, with the at least one processor, cause the apparatus at least to perform:

determining a remaining duration of the COT;
wherein the selection of the one or more DLRS measurements for transmitting in a measurement report is further based, at least in part, on the remaining duration of the COT.

19. A method comprising causing, at least in part, actions that result in:

receiving configuration information for enabling an apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;

receiving information for enabling the apparatus to determine a Quasi-Co-Location (QCL) assumption for a Channel Occupancy Time (COT), wherein the QCL assumption for the COT is indicative of the availability, for use for transmissions within the COT, of:
at least one DL beam associated with the at least one DLRS of the second set of DLRSs, and/or
one or more DL beams associated with the one or more DLRSs of the first set of DLRSs and QCLed with the at least one DLRS of the second set of DLRS; and determining, based at least in part on the received information and configuration information, the QCL assumption for the COT.

20. A non-transitory computer readable medium encoded with instructions that, when performed by at least one processor, causes at least the following to be performed:

receiving configuration information for enabling an apparatus to measure a first set of Downlink Reference Signals (DLRSs) and/or a second set of DLRSs, wherein DLRSs of the first set of DLRSs are respectively associated with a first set of DL beams, wherein one or more DLRSs of the first set of DLRSs are configured to be Quasi-Co-Located (QCLed) with at least one DLRS of the second set of DLRSs, and wherein DLRSs of the second set of DLRSs are respectively associated with a second set of DL beams;

receiving information for enabling the apparatus to determine a Quasi-Co-Location (QCL) assumption for a Channel Occupancy Time (COT), wherein the QCL assumption for the COT is indicative of the availability, for use for transmissions within the COT, of:

at least one DL beam associated with the at least one DLRS of the second set of DLRSs, and/or one or more DL beams associated with the one or more DLRSs of the first set of DLRSs and QCLed with the at least one DLRS of the second set of DLRS; and determining, based at least in part on the received information and configuration information, the QCL assumption for the COT.

* * * * *